(12) United States Patent
Patrick et al.

(10) Patent No.: US 11,020,859 B2
(45) Date of Patent: Jun. 1, 2021

(54) INTEGRATED ROBOTIC SYSTEM AND METHOD FOR AUTONOMOUS VEHICLE MAINTENANCE

(71) Applicant: GE Global Sourcing LLC, Norwalk, CT (US)

(72) Inventors: Romano Patrick, Atlanta, GA (US); Shiraj Sen, Niskayuna, NY (US); Arpit Jain, Niskayuna, NY (US); Huan Tan, Niskayuna, NY (US); Yonatan Gefen, Niskayuna, NY (US); Shuai Li, Troy, NY (US); Shubao Liu, College Park, MD (US); Pramod Sharma, Seattle, WA (US); Balajee Kannan, Niskayuna, NY (US); Viktor Holovashchenko, Niskayuna, NY (US); Douglas Forman, Niskayuna, NY (US); John Michael Lizzi, Niskayuna, NY (US); Charles Burton Theurer, Niskayuna, NY (US); Omar Al Assad, Niskayuna, NY (US); Ghulam Ali Baloch, Niskayuna, NY (US); Frederick Wilson Wheeler, Niskayuna, NY (US); Tai-Peng Tian, Niskayuna, NY (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 167 days.

(21) Appl. No.: 16/240,237

(22) Filed: Jan. 4, 2019

(65) Prior Publication Data
US 2019/0134821 A1 May 9, 2019

Related U.S. Application Data

(63) Continuation-in-part of application No. 15/885,289, filed on Jan. 31, 2018, now Pat. No. 10,252,424, and
(Continued)

(51) Int. Cl.
*B25J 9/16* (2006.01)
*B25J 9/06* (2006.01)
(Continued)

(52) U.S. Cl.
CPC .......... *B25J 9/1697* (2013.01); *B25J 5/007* (2013.01); *B25J 9/06* (2013.01); *B25J 13/084* (2013.01);
(Continued)

(58) Field of Classification Search
CPC ........ B25J 9/1697; B25J 5/007; B25J 19/023; B25J 9/06; B25J 13/084; B25J 19/021;
(Continued)

(56) References Cited

U.S. PATENT DOCUMENTS

2010/0076631 A1* 3/2010 Mian .................. B61G 7/04
701/19
2016/0195390 A1* 7/2016 Nissen .................. B25J 9/1676
702/155

* cited by examiner

Primary Examiner — Peter D Nolan
Assistant Examiner — Ashley L Redhead, Jr.
(74) Attorney, Agent, or Firm — Mary D. Lawlor; The Small Patent Law Group LLC

(57) ABSTRACT

A robotic system includes a controller configured to obtain image data from one or more optical sensors and to determine one or more of a location and/or pose of a vehicle component based on the image data. The controller also is configured to determine a model of an external environment of the robotic system based on the image data and to determine tasks to be performed by components of the robotic system to perform maintenance on the vehicle component. The controller also is configured to assign the tasks to the components of the robotic system and to communicate control signals to the components of the robotic system to autonomously control the robotic system to perform the maintenance on the vehicle component.

20 Claims, 12 Drawing Sheets

Related U.S. Application Data a continuation-in-part of application No. 15/292,605, filed on Oct. 13, 2016, now abandoned, and a continuation-in-part of application No. 15/058,560, filed on Mar. 2, 2016, now Pat. No. 10,272,573, said application No. 15/885,289 is a continuation of application No. 14/702,014, filed on May 1, 2015, now Pat. No. 9,889,566.

(60) Provisional application No. 62/342,510, filed on May 27, 2016, provisional application No. 62/269,377, filed on Dec. 18, 2015, provisional application No. 62/269,425, filed on Dec. 18, 2015, provisional application No. 62/269,481, filed on Dec. 18, 2015, provisional application No. 62/269,523, filed on Dec. 18, 2015.

(51) Int. Cl.
| | | |
|---|---|---|
| *B25J 13/08* | (2006.01) | |
| *G05D 1/00* | (2006.01) | |
| *B25J 5/00* | (2006.01) | |
| *B25J 19/02* | (2006.01) | |

(52) U.S. Cl.
CPC .............. *B25J 19/023* (2013.01); *G05D 1/00* (2013.01); *G05B 2219/39391* (2013.01); *G05B 2219/40298* (2013.01); *G05B 2219/40323* (2013.01); *G05B 2219/42263* (2013.01); *Y10S 901/09* (2013.01)

(58) Field of Classification Search
CPC .......... B25J 5/00; G05D 1/00; G05D 1/0274; G05D 1/0246; G05D 1/0212; G05B 2219/40298; G05B 2219/40323; G05B 2219/39391; G05B 2219/42263; Y10S 901/09
See application file for complete search history.

INTEGRATED ROBOTIC SYSTEM AND METHOD FOR AUTONOMOUS VEHICLE MAINTENANCE

CROSS-REFERENCE TO RELATED APPLICATIONS

This application is a continuation-in-part of and claims priority to U.S. patent application Ser. No. 15/292,605 (U.S. Pat. Pub. No. 2017-0341236), which was filed on Oct. 13, 2016, and is titled "Integrated Robotic System and Method for Autonomous Vehicle Maintenance" which claims priority to U.S. Provisional Application No. 62/342,510, filed May 27, 2016, the entire disclosure of each is incorporated herein by reference.

This application also is a continuation-in-part of and claims priority to U.S. patent application Ser. No. 15/885,289, filed Jan. 31, 2018, and is titled "Systems and Methods for Control of Robotic Manipulation" that claims priority to, and is a continuation of, U.S. patent application Ser. No. 14/702,014 (now U.S. Pat. No. 9,889,566), filed 1 May 2015, and entitled "Systems and Methods for Control of Robotic Manipulation," the entire subject matter of each is incorporated herein by reference.

This application also is a continuation-in-part of and claims priority to U.S. patent application Ser. No. 15/058,560 (U.S. Pat. Pub. No. 2017-0173790, filed Mar. 2, 2016, and is titled "Control System and Method for Applying Force to Grasp a Brake Lever", that claims priority to U.S. Provisional Application Nos. 62/269,523; 62/269,425; 62/269,377; and 62/269,481, all of which were filed on 18 Dec. 2015, and the entire disclosure of each is incorporated herein by reference.

FIELD

The subject matter described herein relates to systems and methods for autonomously maintaining vehicles.

BACKGROUND

The challenges in the modern vehicle yards are vast and diverse. Classification yards, or hump yards, play an important role as consolidation nodes in vehicle freight networks. At classification yards, inbound vehicle systems (e.g., trains) are disassembled and the cargo-carrying vehicles (e.g., railcars) are sorted by next common destination (or block). The efficiency of the yards in part drives the efficiency of the entire transportation network.

The hump yard is generally divided into three main areas: the receiving yard, where inbound vehicle systems arrive and are prepared for sorting; the class yard, where cargo-carrying vehicles in the vehicle systems are sorted into blocks; and the departure yard, where blocks of vehicles are assembled into outbound vehicle systems, inspected, and then depart.

Current solutions for field service operations are labor-intensive, dangerous, and limited by the operational capabilities of humans being able to make critical decisions in the presence of incomplete or incorrect information. Furthermore, efficient system level-operations require integrated system wide solutions, more than just point solutions to key challenges. The nature of these missions dictates that the tasks and environments cannot always be fully anticipated or specified at the design time, yet an autonomous solution may need the essential capabilities and tools to carry out the mission even if it encounters situations that were not expected.

Solutions for typical vehicle yard problems, such as brake bleeding, brake line lacing, coupling cars, etc., can require combining mobility, perception, and manipulation toward a tightly integrated autonomous solution. When placing robots in an outdoor environment, technical challenges largely increase, but field robotic application benefits both technically and economically. One key challenge in yard operation is that of bleeding brakes on inbound cars in the receiving yard. Railcars have pneumatic breaking systems that work on the concept of a pressure differential. The size of the brake lever is significantly small compared to the size of the environment and the cargo-carrying vehicles. Additionally, there are lots of variations on the shape, location, and the material of the brake levers. Coupled with that is the inherent uncertainty in the environment; every day, vehicles are placed at different locations, and the spaces between cars are very narrow and unstructured. As a result, an autonomous solution for maintenance (e.g., brake maintenance) of the vehicles presents a variety of difficult challenges.

BRIEF DESCRIPTION

In one embodiment, a robotic system includes a controller configured to obtain image data from one or more optical sensors and to determine one or more of a location and/or pose of a vehicle component based on the image data. The controller also is configured to determine a model of an external environment of the robotic system based on the image data and to determine tasks to be performed by components of the robotic system to perform maintenance on the vehicle component. The controller also is configured to assign the tasks to the components of the robotic system and to communicate control signals to the components of the robotic system to autonomously control the robotic system to perform the maintenance on the vehicle component. A propulsion system moves the robotic system based on the control signals, and a manipulator arm configured to actuate the rail vehicle component based on the control signals. The model of the external environment of the robotic system provides locations of objects external to the robotic system relative to the robotic system, grades off a surface on which the robotic system is traveling, and obstructions in the moving path of the robotic system, and the model of the external environment of the robotic system is determined only for a designated volume around the manipulator arm.

In one embodiment, a method includes obtaining image data from one or more optical sensors, determining one or more of a location or pose of a vehicle component based on the image data, determining a model of an external environment of the robotic system based on the image data, determining tasks to be performed by components of the robotic system to perform maintenance on the vehicle component, assigning the tasks to the components of the robotic system, and communicating control signals to the components of the robotic system to autonomously control the robotic system to perform the maintenance on the vehicle component.

In one embodiment, a robotic system includes one or more optical sensors configured to generate image data representative of an external environment and a controller configured to obtain the image data and to determine one or more of a location or pose of a vehicle component based on the image data. The controller also can be configured to determine tasks to be performed by components of the robotic system to perform maintenance on the vehicle component and to assign the tasks to the components of the robotic system based on the image data and based on a model of the external environment. The controller can be configured to communicate control signals to the components of the robotic system to autonomously control the robotic system to perform the maintenance on the vehicle component. A propulsion system moves the robotic system based on the control signals, and a manipulator arm configured to actuate the rail vehicle component based on the control signals. The controller is configured to determine waypoints for the propulsion system of the robotic system to move the robotic system based on one or more of the tasks assigned to the propulsion system by the controller and on a mapping of a location of the robotic system in the model of the external environment determined by the controller, and 3D image data is examined using real-time simultaneous localization and mapping to determine the model of the external environment of the robotic system.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide robotic systems and methods that provide a large form factor mobile robot with an industrial manipulator arm to effectively detect, identify, and subsequently manipulate components to perform maintenance on vehicles, which can include inspection and/or repair of the vehicles. While the description herein focuses on manipulating brake levers of vehicles (e.g., rail vehicles) in order to bleed air brakes of the vehicles, not all maintenance operations performed by the robotic systems or using the methods described herein are limited to brake bleeding. One or more embodiments of the robotic systems and methods described herein can be used to perform other maintenance operations on vehicles, such as obtaining information from vehicles (e.g., AEI tag reading), inspecting vehicles (e.g., inspecting couplers between vehicles), air hose lacing, etc.

The robotic system autonomously navigates within a route corridor along the length of a vehicle system, moving from vehicle to vehicle within the vehicle system. An initial "coarse" estimate of a location of a brake rod or lever on a selected or designated vehicle in the vehicle system is provided to or obtained by the robotic system. This coarse estimate can be derived or extracted from a database or other memory structure that represents the vehicles present in the corridor (e.g., the vehicles on the same segment of a route within the yard). The robotic system moves through or along the vehicles and locates the brake lever rods on the side of one or more, or each, vehicle. The robotic system positions itself next to a brake rod to then actuate a brake release mechanism (e.g., to initiate brake bleeding) by manipulating the brake lever rod.

During autonomous navigation, the robotic system maintains a distance of separation (e.g., about four inches or ten centimeters) from the plane of the vehicle while moving forward toward the vehicle. In order to ensure real-time brake rod detection and subsequent estimation of the brake rod location, a two-stage detection strategy is utilized. Once the robotic system has moved to a location near to the brake rod, an extremely fast two-dimensional (2-D) vision-based search is performed by the robotic system to determine and/or confirm a coarse location of the brake rod. The second stage of the detection strategy involves building a dense model for template-based shape matching (e.g., of the brake rod) to identify the exact location and pose of the break rod. The robotic system can move to approach the brake rod as necessary to have the brake rod within reach of the robotic arm of the robotic system. Once the rod is within reach of the robotic arm, the robotic system uses the arm to manipulate and actuate the rod.

Figure 1:
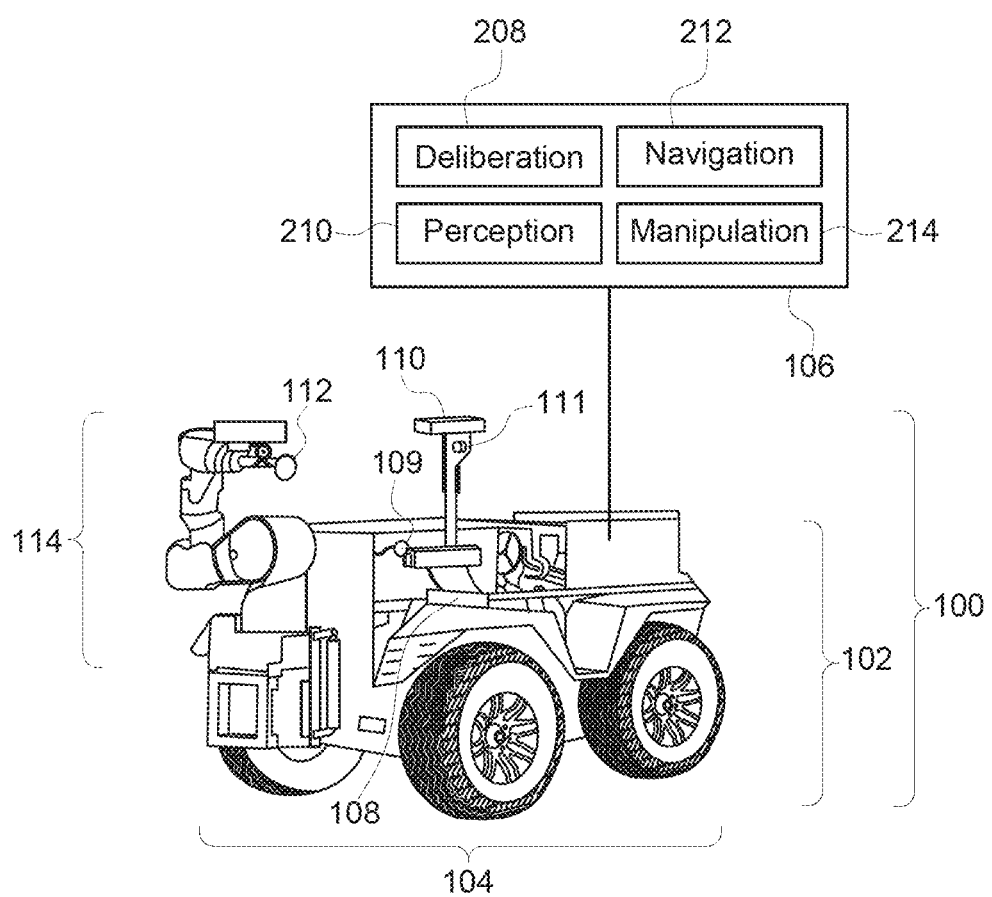
FIG. 1 illustrates one embodiment of a robotic system.

FIG. 1 illustrates one embodiment of a robotic system 100. The robotic system 100 may be used to autonomously move toward, grasp, and actuate (e.g., move) a brake lever or rod on a vehicle in order to change a state of a brake system of the vehicle. For example, the robotic system 100 may autonomously move toward, grasp, and move a brake rod of an air brake system on a rail car in order to bleed air out of the brake system. The robotic system 100 includes a robotic vehicle 102 having a propulsion system 104 that operates to move the robotic system 100. The propulsion system 104 may include one or more motors, power sources (e.g., batteries, alternators, generators, etc.), or the like, for moving the robotic system 100. A controller 106 of the robotic system 100 includes hardware circuitry that includes and/or is connected with one or more processors (e.g., microprocessors, field programmable gate arrays, and/or integrated circuits) that direct operations of the robotic system 100.

The robotic system 100 also includes several sensors 108, 109, 110, 111, 112 that measure or detect various conditions used by the robotic system 100 to move toward, grasp, and actuate brake levers. The sensors 108-111 are optical sensors, such as cameras, infrared projectors and/or detectors. While four optical sensors 108, 110 are shown, alternatively, the robotic system 100 may have a single optical sensor, less than four optical sensors, or more than four optical sensors. In one embodiment, the sensors 109, 111 are RGB cameras and the sensors 110, 112 are structured-light three-dimensional (3-D) cameras, but alternatively may be another type of camera.

The sensor 112 is a touch sensor that detects when a manipulator arm 114 of the robotic system 100 contacts or otherwise engages a surface or object. The touch sensor 112 may be one or more of a variety of touch-sensitive devices, such as a switch (e.g., that is closed upon touch or contact), a capacitive element (e.g., that is charged or discharged upon touch or contact), or the like.

The manipulator arm 114 is an elongated body of the robotic system 100 that can move in a variety of directions, grasp, and pull and/or push a brake rod. The controller 106 may be operably connected with the propulsion system 104 and the manipulator arm 114 to control movement of the robotic system 100 and/or the arm 114, such as by one or more wired and/or wireless connections. The controller 106 may be operably connected with the sensors 108-112 to receive data obtained, detected, or measured by the sensors 108-112.

Figure 2:
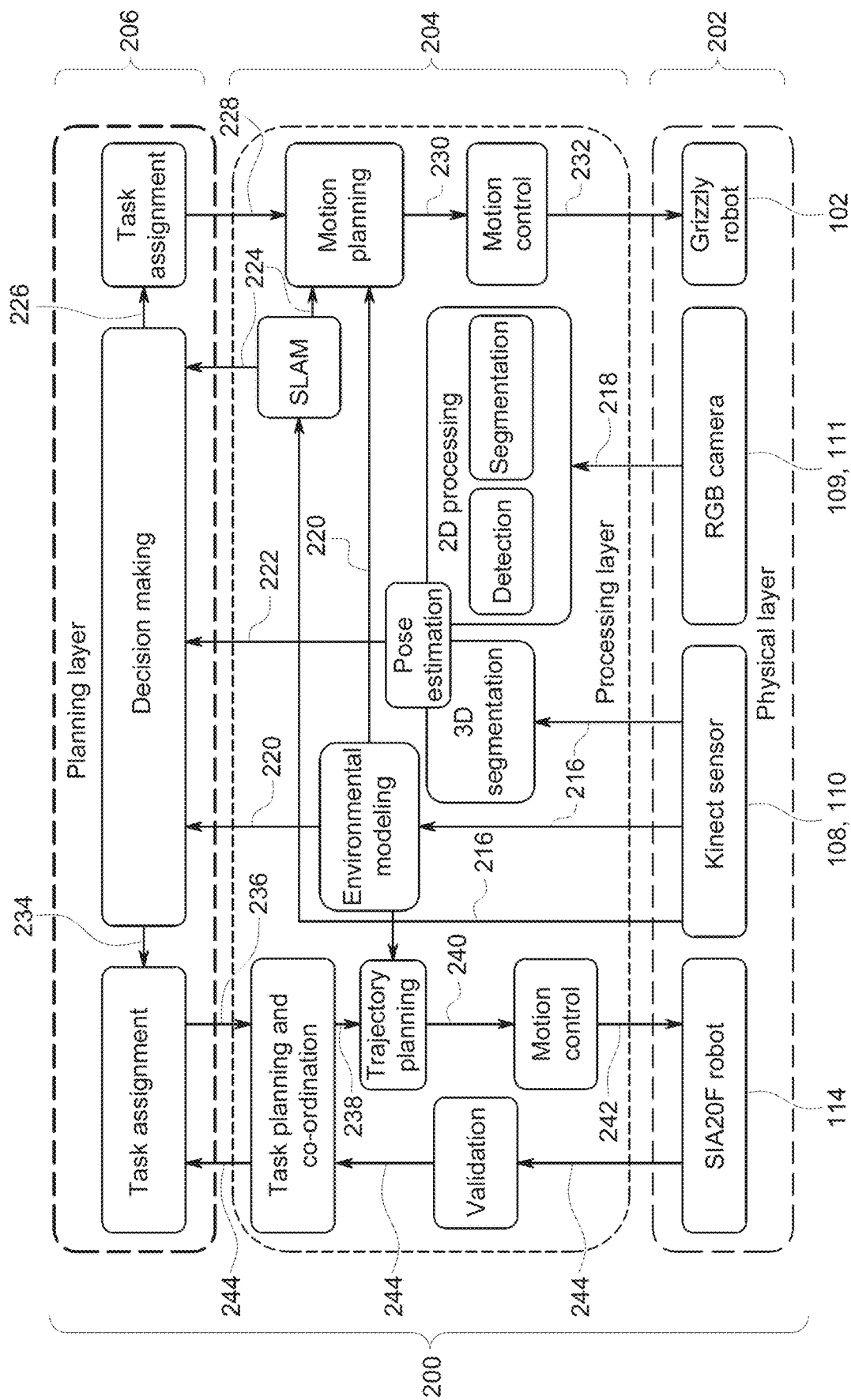
FIG. 2 illustrates a control architecture used by the robotic system shown in FIG. 1 to move toward, grasp, and actuate a brake lever or rod according to one embodiment.

FIG. 2 illustrates a control architecture 200 used by the robotic system 100 to move toward, grasp, and actuate a brake lever or rod according to one embodiment. The architecture 200 may represent the operations performed by various components of the robotic system 100. The architecture 200 is composed of three layers: a physical layer 202, a processing layer 204, and a planning layer 206. The physical layer 202 includes the robotic vehicle 102 (including the propulsion system 104, shown as "Grizzly Robot" in FIG. 2), the sensors 108-112 (e.g., the "RGB Camera" as the sensors 109, 111 and the "Kinect Sensor" as the sensors 108, 110 in FIG. 2), and the manipulator arm 114 (e.g., the "SIA20F Robot" in FIG. 2).

The processing layer 204 is embodied in the controller 106, and dictates operation of the robotic system 100. The processing layer 204 performs or determines how the robotic system 100 will move or operate to perform various tasks in a safe and/or efficient manner. The operations determined by the processing layer 204 can be referred to as modules. These modules can represent the algorithms or software used by the processing layer 204 to determine how to perform the operations of the robotic system 100, or optionally represent the hardware circuitry of the controller 106 that determines how to perform the operations of the robotic system 100. The modules are shown in FIG. 1 inside the controller 106.

The modules of the processing layer 204 include a deliberation module 208, a perception module 210, a navigation module 212, and a manipulation module 214. The deliberation module 208 is responsible for planning and coordinating all behaviors or movements of the robotic system 100. The deliberation module 208 can determine how the various physical components of the robotic system 100 move in order to avoid collision with each other, with vehicles, with human operators, etc., while still moving to perform various tasks. The deliberation module 208 receives processed information from one or more of the sensors 108-112 and determines when the robotic vehicle 102 and/or manipulator arm 114 are to move based on the information received or otherwise provided by the sensors 108-112.

The perception module 210 receives data provided by the sensors 108-112 and processes this data to determine the relative positions and/or orientations of components of the vehicles. For example, the perception module 210 may receive image data provided by the sensors 108-111 and determine the location of a brake lever relative to the robotic system 100, as well as the orientation (e.g., pose) of the brake lever. At least some of the operations performed by the perception module 210 are shown in FIG. 2. For example, the perception module 210 can perform 2D processing of image data provided by the sensors 109, 111. This 2D processing can involve receiving image data from the sensors 109, 111 ("Detection" in FIG. 2) and examining the image data to identify components or objects external to the robotic system 100 (e.g., components of vehicles, "Segmentation" in FIG. 2). The perception module 210 can perform 3D processing of image data provided by the sensors 108, 110. This 3D processing can involve identifying different portions or segments of the objects identified via the 2D processing ("3D Segmentation" in FIG. 2). From the 2D and 3D image processing, the perception module 210 may determine the orientation of one or more components of the vehicle, such as a pose of a brake lever ("Pose estimation" in FIG. 2).

The navigation module 212 determines the control signals generated by the controller 106 and communicated to the propulsion system 104 to direct how the propulsion system 104 moves the robotic system 100. The navigation module 212 may use a real-time appearance-based mapping (RTAB-Map) algorithm (or a variant thereof) to plan how to move the robotic system 100. Alternatively, another algorithm may be used.

The navigation module 212 may use modeling of the environment around the robotic system 100 to determine information used for planning motion of the robotic system 100. Because the actual environment may not be previously known and/or may dynamically change (e.g., due to moving human operators, moving vehicles, errors or discrepancies between designated and actual locations of objects, etc.), a model of the environment may be determined by the controller 106 and used by the navigation module 212 to determine where and how to move the robotic system 100 while avoiding collisions. The manipulation module 214 determines how to control the manipulator arm 114 to engage (e.g., touch, grasp, etc.) one or more components of a vehicle, such as a brake lever.

In the planning layer 206, the information obtained by the sensors 108-112 and state information of the robotic system 100 are collected from the lower layers 202, 204. According to the requirements of a task to be completed or performed by the robotic system 100, the controller 106 (e.g., within the planning layer 206) will make different decisions based on the current task-relevant situation being performed or the next task to be performed by the robotic system 100. A state machine can tie the layers 202, 204, 206 together and transfer signals between the navigation module 212 and the perception module 210, and then to the manipulation module 214. If there is an emergency stop signal generated or there is error information reported by one or more of the modules, the controller 106 may responsively trigger safety primitives such as stopping movement of the robotic system 100 to prevent damage to the robotic system 100 and/or surrounding environment.

As shown in FIG. 2, the processing layer 204 of the controller 106 may receive image data 216 from the sensors 108, 110. This image data 216 can represent or include 3D image data representative of the environment that is external to the robotic system 100. This image data 216 is used by the processing layer 204 of the controller 106 to generate a model or other representation of the environment external to the robotic system 100 ("Environmental Modeling" in FIG. 2) in one embodiment. The environmental modeling can represent locations of objects relative to the robotic system 100, grades of the surface on which the robotic vehicle 102 is traveling, obstructions in the moving path of the robotic system 100, etc. The 3D image data 216 optionally can be examined using real-time simultaneous localization and mapping (SLAM) to model the environment around the robotic system 100.

The processing layer 204 can receive the image data 216 from the sensors 108, 110 and/or image data 218 from the sensors 109, 111. The image data 218 can represent or include 2D image data representative of the environment that is external to the robotic system 100. The 2D image data 218 can be used by the processing layer 204 of the controller 106 to identify objects that may be components of a vehicle, such as a brake lever ("2D Processing" in FIG. 2). This identification may be performed by detecting potential objects ("Detection" in FIG. 2) based on the shapes and/or sizes of the objects in the 2D image data and segmenting the objects into smaller components ("Segmentation" in FIG. 2). The 3D image data 216 can be used by the processing layer 204 to further examine these objects and determine whether the objects identified in the 2D image data 218 are or are not designated objects, or objects of interest, such as a component to be grasped, touched, moved, or otherwise actuated by the robotic system 100 to achieve or perform a designated task (e.g., moving a brake lever to bleed air brakes of a vehicle). In one embodiment, the processing layer 204 of the controller 106 uses the 3D segmented image data and the 2D segmented image data to determine an orientation (e.g., pose) of an object of interest ("Pose estimation" in FIG. 2). For example, based on the segments of a brake lever in the 3D and 2D image data, the processing layer 204 can determine a pose of the brake lever.

The planning layer 206 of the controller 106 can receive at least some of this information to determine how to operate the robotic system 100. For example, the planning layer 206 can receive a model 220 of the environment surrounding the robotic system 100 from the processing layer 204, an estimated or determined pose 222 of an object-of-interest (e.g., a brake lever) from the processing layer 204, and/or a location 224 of the robotic system 100 within the environment that is modeled from the processing layer 204.

In order to move in the environment, the robotic system 100 generates the model 220 of the external environment in order to understand the environment. In one embodiment, the robotic system 100 may be limited to moving only along the length of a vehicle system formed from multiple vehicles (e.g., a train typically about 100 rail cars long), and does not need to move longer distance. As a result, more global planning of movements of the robotic system 100 may not be needed or generated. For local movement planning and movement, the planning layer 206 can use a structured light-based SLAM algorithm, such as real-time appearance-based mapping (RTAB-Map), that is based on an incremental appearance-based loop closure detector. Using RTAB-Map, the planning layer 206 of the controller 106 can determine the location of the robotic system 100 relative to other objects in the environment, which can then be used to close a motion control loop and prevent collisions between the robotic system 100 and other objects. The point cloud data provided as the 3D image data can be used recognize the surfaces or planes of the vehicles. This information is used to keep the robotic system 100 away from the vehicles and maintain a pre-defined distance of separation from the vehicles.

In one embodiment, the model 220 is a grid-based representation of the environment around the robotic system 100. The 3D image data collected using the sensors 108, 110 can include point cloud data provided by one or more structured light sensors. The point cloud data points are processed and grouped into a grid.

Figure 3:
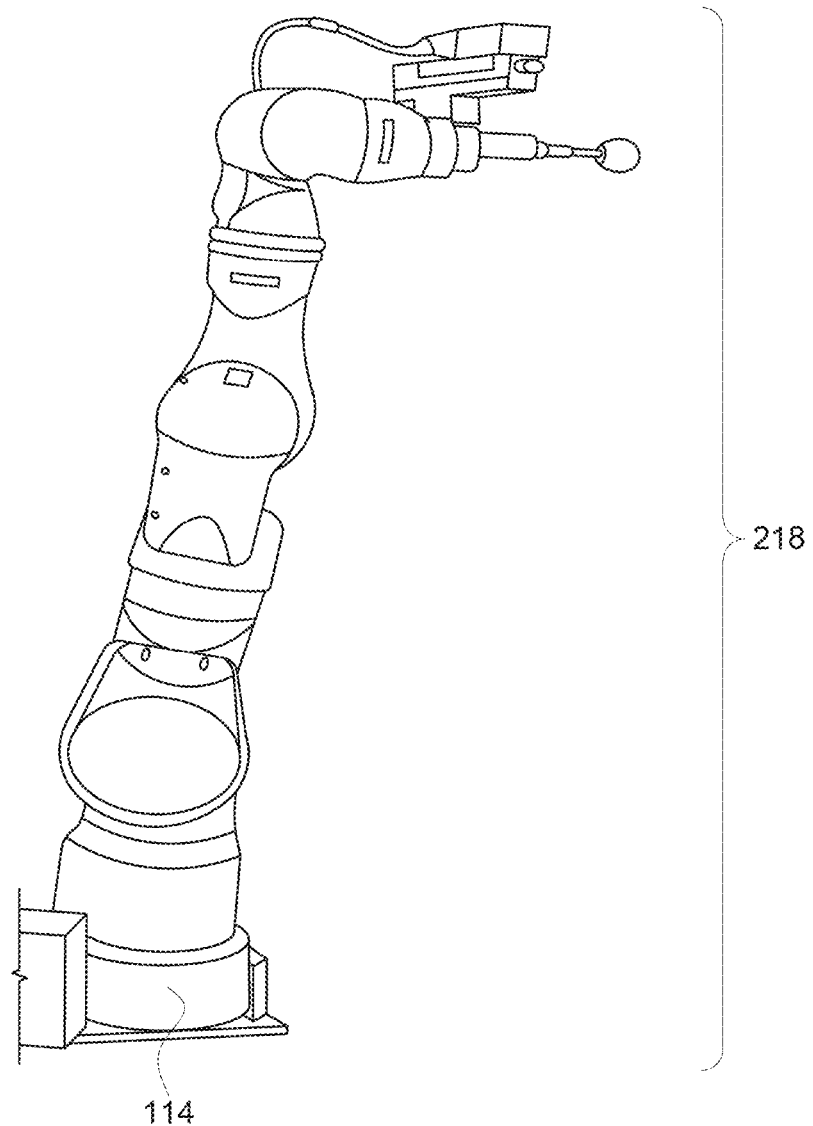
FIG. 3 illustrates 2D image data of a manipulator arm shown in FIG. 1 near a vehicle.
Figure 4:
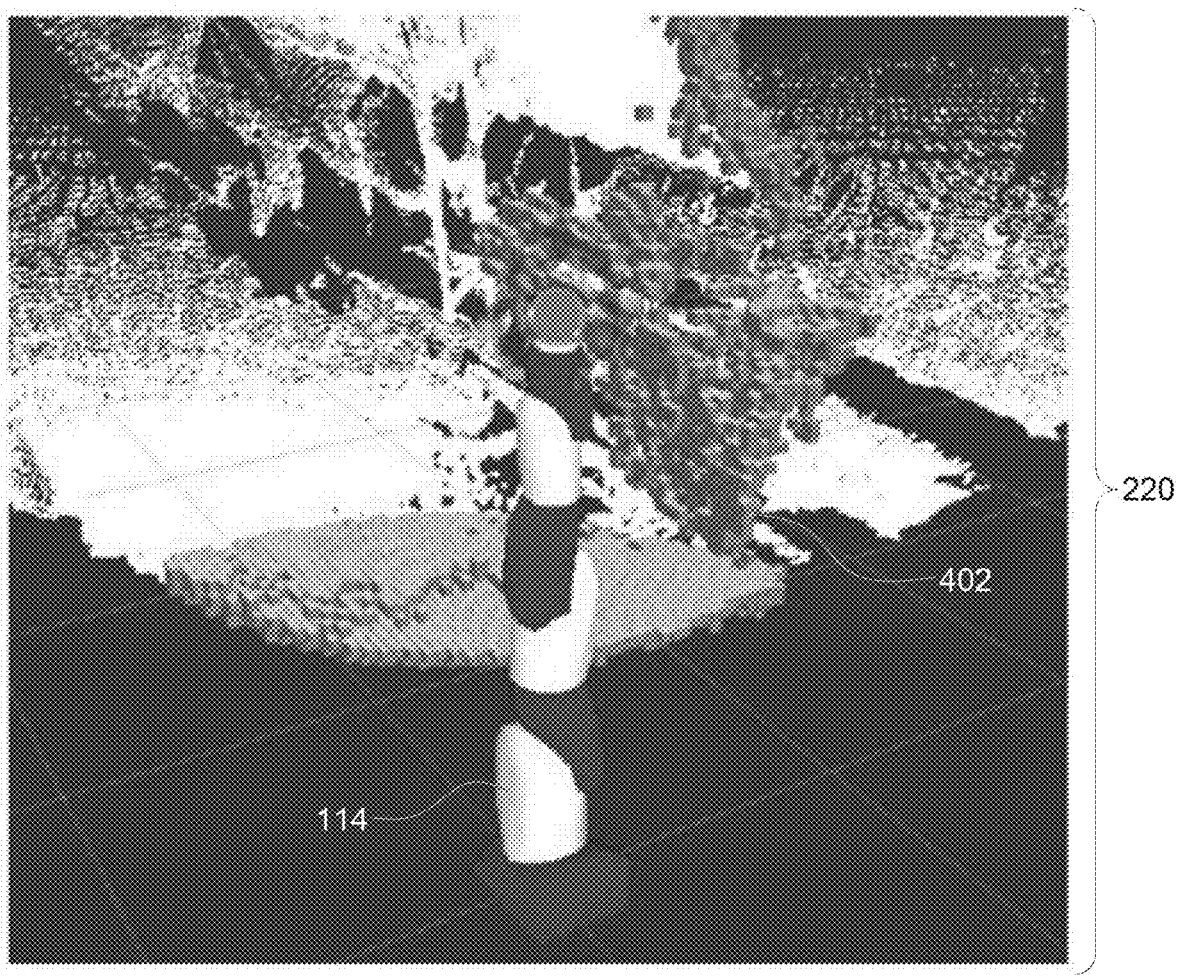
FIG. 4 illustrates one example of a model of an external environment around the manipulator arm.

FIG. 3 illustrates 2D image data 218 of the manipulator arm 114 near a vehicle. FIG. 4 illustrates one example of the model 220 of the environment around the manipulator arm 114. The model 220 may be created by using grid cubes 402 with designated sizes (e.g., ten centimeters by ten centimeters by ten centimeters to represent different portions of the objects detected using the 2D and/or 3D image data 218, 216. In order to reduce the time needed to generate the model 220, only a designated volume around the arm 114 may be modeled (e.g., the area within a sphere having a radius of 2.5 meters or another distance).

Returning to the description of the control architecture 200 shown in FIG. 2, the planning layer 206 of the controller 106 determines how to operate (e.g., move) the robotic system 100 based on the environmental model of the surroundings of the robotic system 100. This determination can involve determining tasks to be performed and which components of the robotic system 100 are to perform the tasks. the planning layer 206 can determine tasks to be performed by the robotic vehicle 102 to move the robotic system 100. These tasks can include the distance, direction, and/or speed that the robotic vehicle 102 moves the robotic system 100, the sequence of movements of the robotic vehicle 102, and the like. The planning layer 206 can determine how the robotic system 100 moves in order to avoid collisions between the robotic vehicle 102 and the manipulator arm 114, between the robotic vehicle 102 and the object(s) of interest, and/or between the robotic vehicle 102 and other objects.

The movements and/or sequence of movements determined by the planning layer 206 of the controller 106 may be referred to as movement tasks 226. These movement tasks 226 can dictate the order of different movements, the magnitude (e.g., distance) of the movements, the speed and/or acceleration involved in the movements, etc. The movement tasks 226 can then be assigned to various components of the robotic system 100 ("Task Assignment" in FIG. 2). For example, the planning layer 206 can communicate the movement tasks 226 and the different components that are to perform the movement tasks 226 to the processing layer 204 of the controller 106 as assigned movement tasks 228. The assigned movement tasks 228 can indicate the various movement tasks 226 as well as which component (e.g., the robotic vehicle 102 and/or the manipulator arm 114) is to perform the various movement tasks 226.

The processing layer 204 receives the assigned movement tasks 228 and plans the movement of the robotic system 100 based on the assigned movement tasks 228 ("Motion Planning" in FIG. 2). This planning can include determining which component of the robotic vehicle 102 is to perform an assigned task 228. For example, the processing layer 204 can determine which motors of the robotic vehicle 102 are to operate to move the robotic system 100 according to the assigned tasks 228. The motion planning also can be based on the location 224 of the robotic system 100, as determined from SLAM or another algorithm, and/or the model 220 of the environment surrounding the robotic system 100.

The processing layer 204 can determine designated movements 230 and use the designated movements 230 to determine control signals 232 that are communicated to the robotic vehicle 102 ("Motion Control" in FIG. 2). The control signals 232 can be communicated to the propulsion system 104 of the robotic vehicle 102 to direct how the motors or other components of the propulsion system 104 operate to move the robotic system 100 according to the assigned tasks 228.

In another aspect, the planning layer 206 can determine tasks to be performed by the manipulator arm 114 to perform maintenance on a vehicle. These tasks can include the distance, direction, and/or speed that the manipulator arm 114 is moved, the sequence of movements of the manipulator arm 114, the force imparted on the object-of-interest by the manipulator arm 114, and the like. The movements and/or sequence of movements determined by the planning layer 206 of the controller 106 may be referred to as arm tasks 234. The arm tasks 234 can dictate the order of different movements, the magnitude (e.g., distance) of the movements, the speed and/or acceleration involved in the movements, etc., of the manipulator arm 114. The arm tasks 234 can then be assigned to the manipulator arm 114 (or to individual motors of the arm 114 as the other "Task Assignment" in FIG. 2).

The planning layer 206 can communicate the arm tasks 234 and the different components that are to perform the tasks 234 to the processing layer 204 of the controller 106 as assigned arm tasks 236. The assigned tasks 236 can indicate the various tasks 234 as well as which component (e.g., the robotic vehicle 102 and/or the manipulator arm 114) is to perform the various tasks 234. The processing layer 204 receives the assigned arm tasks 236 and plans the movement of the manipulator arm 114 based on the assigned arm tasks 236 ("Task Planning And Coordination" in FIG. 2). This planning can include determining which component of the manipulator arm 114 is to perform an assigned arm task 236. For example, the processing layer 204 can determine which motors of the manipulator arm 114 are to operate to move the manipulator arm 114 according to the assigned arm tasks 236.

The processing layer 204 can determine planned arm movements 238 based on the assigned arm tasks 236. The planned arm movements 238 can include the sequence of movements of the arm 114 to move toward, grasp, move, and release one or more components of a vehicle, such as a brake lever. In one example the vehicle is a rail vehicle, though in other examples components of other types of vehicles are provided. The processing layer 204 can determine movement trajectories 240 of the arm 114 based on the planned arm movements 238 ("Trajectory Planning" in FIG. 2). The trajectories 240 represent or indicate the paths that the arm 114 is to move along to complete the assigned arm tasks 236 using the planned arm movements 238.

The processing layer 204 of the controller 106 can determine the trajectories 240 of the arm 114 to safely and efficiently move the arm 114 toward the component (e.g., brake lever) to be actuated by the arm 114. The trajectories 240 that are determined can include one or more linear trajectories in joint space, one or more linear trajectories in Cartesian space, and/or one or more point-to-point trajectories in joint space.

When the arm 114 is moving in an open space for a long distance and far away from the vehicles and components (e.g., brake levers), the trajectories 240 may not be generated based on motion patterns of the arm 114. The starting position and target position of the motion of the arm 114 can be defined by the processing layer 204 based on the planned arm movements 238. Using an algorithm such as an artificial potential field algorithm, one or more waypoints for movement of the arm 114 can be determined. These waypoints can be located along lines in six degrees of freedom, but be located along non-linear lines in the Cartesian space. The processing layer 204 can assign velocities to each waypoint depending on the task requirements. One or more of the trajectories 240 can be these waypoints and velocities of movements of the arm 114.

Alternatively, if the positions of the components (e.g., brake levers) to be actuated by the arm 114 are defined as 6D poses in Cartesian space, the processing layer 204 of the controller 106 may convert the 6D pose estimation 222 to six joint angles in joint space using inverse kinematics. The processing layer 204 can then determine trajectories 240 for the arm 114 to move to these joint angles of the component from the current location and orientation of the arm 114.

Alternatively, the artificial potential field algorithm can be used to determine the waypoints for movement of the arm 114 on a desired motion trajectory in Cartesian space. Using inverse kinematics, corresponding waypoints in the joint space may be determined from the waypoints in Cartesian space. Velocities can then be assigned to these way points to provide the trajectories 240.

The trajectories 240 that are determined can be defined as one or more sequences of waypoints in the joint space. Each waypoint can include the information of multiple (e.g., seven) joint angles, timing stamps (e.g., the times at which the arm 114 is to be at the various waypoints), and velocities for moving between the waypoints. The joint angles, timing stamps, and velocities are put into a vector of points to define the trajectories 240. The processing layer 204 can use the trajectories 240 to determine control signals 242 that are communicated to the manipulator arm 114 (the other "Motion Control" in FIG. 2). The control signals 242 can be communicated to the motors or other moving components of the arm 114 to direct how the arm 114 is to move.

In one embodiment, the sensor 112 (shown in FIG. 1) may include a microswitch attached to the manipulator arm 114. Whenever the arm 114 or the distal end of the arm 114 engages a component of the vehicle or other object, the microswitch sensor 112 is triggered to provide a feedback signal 244. This feedback signal 244 is received ("Validation" in FIG. 2) by the processing layer 204 of the controller 106 from the sensor 112, and may be used by the processing layer 204 to determine the planned arm movements 238. For example, the processing layer 204 can determine how to move the arm 114 based on the tasks 236 to be performed by the arm 114 and the current location or engagement of the arm 114 with the component or vehicle (e.g., as determined from the feedback signal 244). The planning layer 206 may receive the feedback signal 244 and use the information in the feedback signal 244 to determine the arm tasks 234. For example, if the arm 114 is not yet engaged with the vehicle or component, then an arm task 236 created by the planning layer 206 may be to continue moving the arm 114 until the arm 114 engages the vehicle or component.

Once the arm 114 engages the component, the arm 114 may perform one or more operations. These operations can include, for example, moving the component to bleed air from brakes of the vehicle or other operations.

Figure 5:
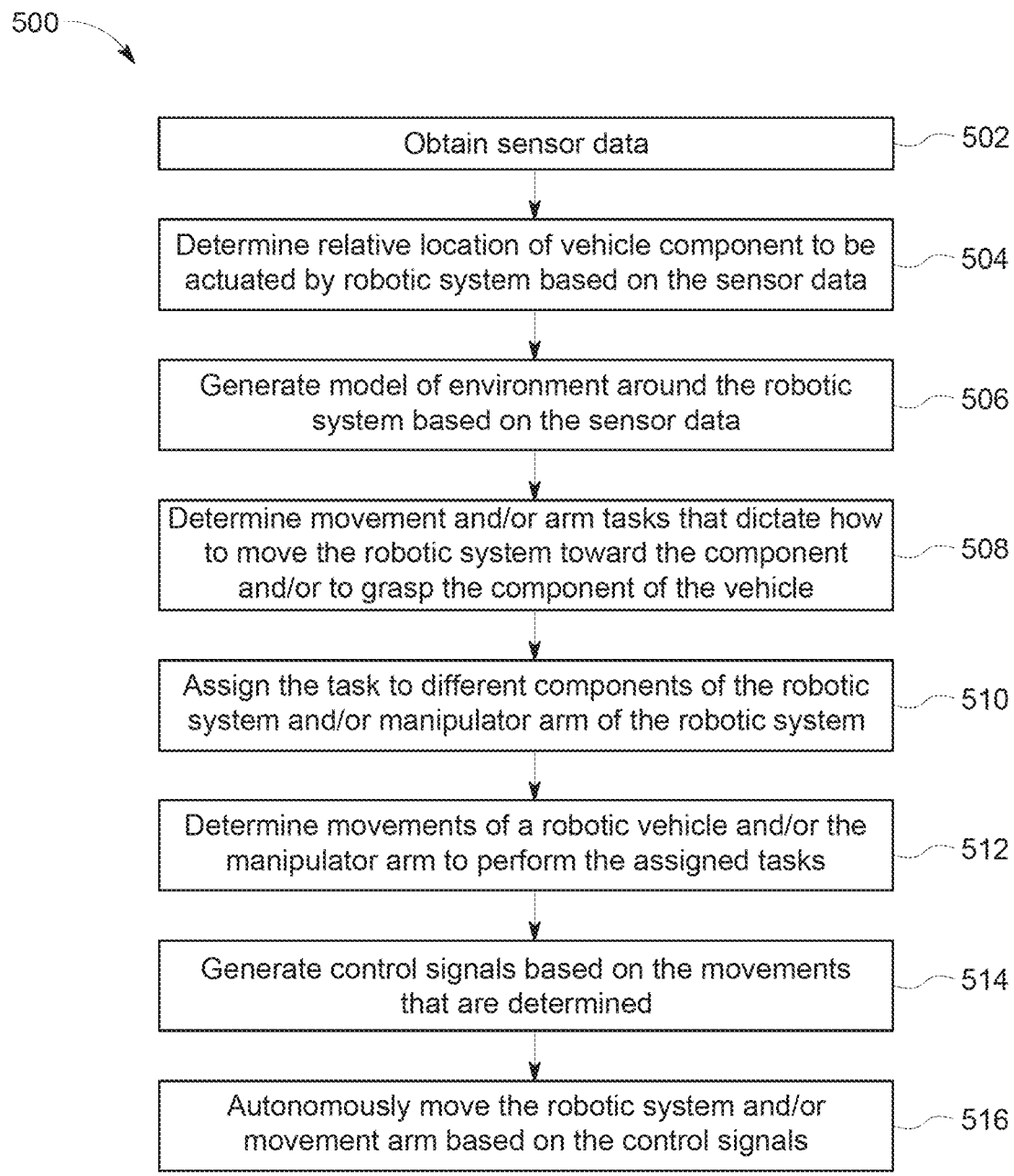
FIG. 5 illustrates a flowchart of one embodiment of a method for autonomous control of a robotic system for vehicle maintenance.

FIG. 5 illustrates a flowchart of one embodiment of a method 500 for autonomous control of a robotic system for vehicle maintenance. The method 500 may be performed to control movement of the robotic system 100 in performing vehicle maintenance, such as bleeding air brakes of a vehicle. In one embodiment, the various modules and layers of the controller 106 perform the operations described in connection with the method 500. At 502, sensor data is obtained from one or more sensors operably connected with the robotic system. For example, 2D image data, 3D image data, and/or detections of touch may be provided by the sensors 108-112. In other examples, infrared data, wave-related data, or the like is detected and used to form an image.

At 504, the image data obtained from the sensor(s) is examined to determine a relative location of a component of a vehicle to be actuated by the robotic system. For example, the image data provided by the sensors 108-111 may be examined to determine the location of a brake lever relative to the robotic system 100, as well as the orientation (e.g., pose) of the brake lever. Alternatively, a target object may be determined, such as control toggle positions, actuator positions, or the like may be examined. At 506, a model of the environment around the robotic system is generated based on the image data, as described above. Thus, in one example the environment includes the brake lever, control toggles, actuators, or the like.

At 508, a determination is made as to how to control movement of the robotic system to move the robotic system toward a component of a vehicle to be actuated by the robotic system. This determination may involve examining the environmental model to determine how to safely and efficiently move the robotic system to a location where the robotic system can grasp and actuate the component. This determination can involve determining movement tasks and/or arm tasks to be performed and which components of the robotic system are to perform the tasks. The tasks can include the distance, direction, and/or speed that the robotic vehicle moves the robotic system and/or manipulator arm, the sequence of movements of the robotic vehicle and/or arm, and the like.

At 510, the movement and/or arm tasks determined at 508 are assigned to different components of the robotic system. The tasks may be assigned to the robotic vehicle, the manipulator arm, or components of the robotic vehicle and/or arm for performance by the corresponding vehicle, arm, or component.

At 512, the movements by the robotic vehicle and/or manipulator arm to perform the assigned tasks are determined. For example, the directions, distances, speeds, etc., that the robotic vehicle and/or arm need to move to be in positions to perform the assigned tasks are determined. In one example a reinforcement learning algorithm is utilized to make these determinations, such that during every iteration of a task, weights are assigned, or rewards are provided for successful outcomes to tasks. Thus, the robotic vehicle actively how to perform the task more efficiently during future iterations.

At 514, control signals based on the movements determined at 512 are generated and communicated to the components of the robotic vehicle and/or arm. These control signals direct motors or other powered components of the vehicle and/or arm to operate in order to perform the assigned tasks. At 516, the robotic vehicle and/or manipulator arm autonomously move to actuate the component of the vehicle on which maintenance is to be performed by the robotic system.

Alternatively and additionally, in another embodiment as illustrated in U.S. Ser. No. 15/885,289, filed Jan. 31, 2018, entitled Systems and Methods for Control of Robotic Manipulation, to Huan et. al. that is incorporated in full herein, an alternative robot system 600 is illustrated as provided and described in relation to FIGS. 6-9. Generally, various embodiments provide methods and systems for control of robotic systems. For example, various embodiments provide for control of a robot to approach and/or interact with a target object. In one example, navigation module 212 of the robotic system 100 of FIGS. 1-5 includes methodologies as described in relation to FIGS. 6-9. In some embodiments, the robotic systems are controlled to grasp a lever, such as a lever to perform a brake bleeding operation. In various embodiments, perception information corresponding to a position of a target object is obtained at a rate that is slower than a control rate, and a predictive motion model is used to estimate a position of a target object between acquisitions of perception information, with the estimation result used in a stepwise closed loop control mechanism to synchronize perception and motion control, and to increase system precision.

At least one technical effect of various embodiments includes improving control (e.g., continuous servo control) reliability, accuracy, and/or precision for robotic systems. At least one technical effect of various embodiments is the improvement of robotic control for systems having higher control rates than acquisition rates (e.g., acquisition rates for perception information from a camera or three dimensional (3D) sensor). At least one technical effect of various embodiments is the improvement of robotic control for systems having control rates that are not synchronized with acquisition rates. At least one technical effect of various embodiments is the elimination or reduction of issues related to over-control of robotic systems. At least one technical effect of various embodiments includes maintaining a highest available response rate of a system (for example, the highest rate of major modules of a control system, such as a rate of an actuation module).

Figure 6:
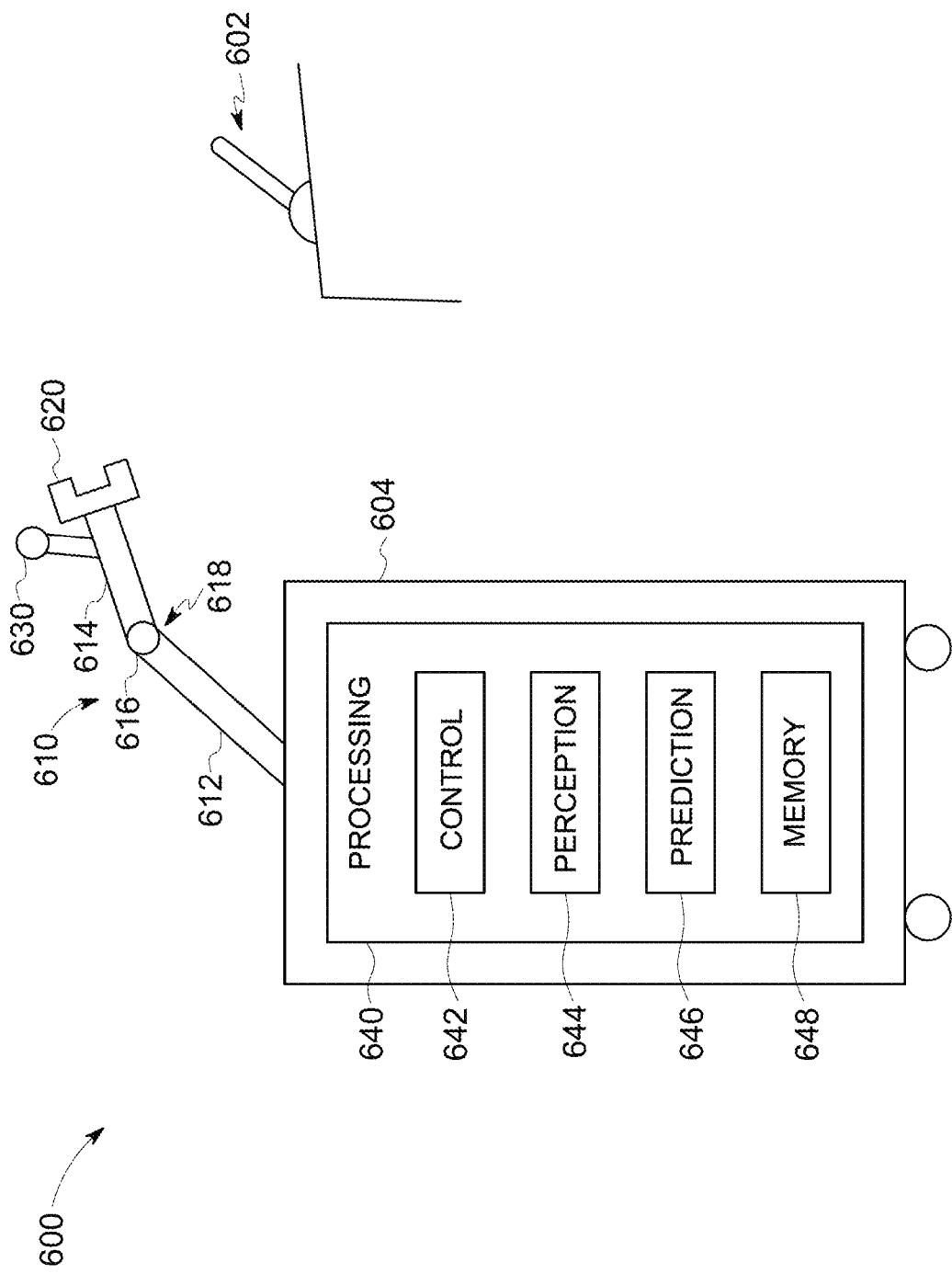
FIG. 6 is a schematic block diagram of a robotic system in accordance with various embodiments.

FIG. 6 is a schematic view of a robot system 600 in accordance with various embodiments. The robot system 600 is configured to manipulate (e.g., one or more of grasp, contact, actuate, or otherwise engage) a target object 602. For example, the target object 602 may be a lever which the robot system 600 is configured to grasp and actuate. In some embodiments, the target object 602 may be a brake bleed lever of a rail car. As seen in FIG. 6, the depicted robot system 600 includes an articulable arm 610, a manipulator unit 620, a perception acquisition unit 630, and a processing unit 640. Generally, the processing unit 640 (e.g., a control portion of the processing unit 640) acts to control the operation of the robot system 600, including the movement of the arm 610.

In the illustrated embodiment, the arm 610 is articulable and configured to move toward the target object 602 (e.g., based upon instructions or control signals from the processing unit 640). In one example the arm 610 is the manipulator arm 114 of FIG. 1. The depicted manipulator unit 620 is mounted proximate an end of the arm 610 and is configured to grasp the target object 602. As seen in FIG. 6, the perception acquisition unit 630 of the illustrated embodiment is mounted to the arm (e.g., proximate an end of the arm 610 with the manipulator unit 620 attached thereto). The perception acquisition unit 630 is configured to acquire perception information at an acquisition rate. In the illustrated embodiment, the perception information corresponds to a position of the arm 610 relative to the target object 602. For example, the perception information may define, depict, or otherwise correspond to a difference in the positions of the manipulator unit 620 (or a portion thereof) or an end of the arm to which the manipulator unit 620 is mounted and the target object 602 (or a portion thereof). For example, the distance between a grasping portion of the manipulator unit 620 and a portion of the target object 602 to be grasped may be described by the perception information.

The processing unit 640 is operably coupled to the arm 610 (e.g., to control movement of the arm 610) and the perception acquisition unit 630 (e.g., to receive perception information from the perception acquisition unit 630). The processing unit 640 is configured to control movement of the arm 610 at a control rate that is at least one of faster than or unsynchronized with the acquisition rate of the perception acquisition unit 630. For example, the control rate may be between 10-100 Hz, and the acquisition rate may be 1 Hz. The processing unit 640 is also configured to predict positioning of the arm 610 to provide predicted position information using the perception information and control signal information (e.g., information describing, depicting, or corresponding to a direction and/or velocity of a control instruction provided to the arm subsequent to a time corresponding to acquisition of perception information or other determination of a previous position of the arm 610). The processing unit 640 in the illustrated embodiment is also configured to control the arm using the perception information and the predicted position information. The predicted position information may be determined at the control rate and used for modifying subsequent control instructions. In the illustrated embodiment, the processing unit 640 utilizes the predicted position information for feedback and control of the arm 610 between acquisitions of perception information, thereby utilizing predicted position information when current perception information is not available, and utilizing perception information for reliability and accuracy when current perception information is available. As used herein, perception information may be understood as being current when a subsequent control action has not been implemented since the acquisition of the perception information. As seen in FIG. 6, the robot system 600 includes a base or body 604 from which the arm 610 extends. In various embodiments, the robot system 600 (e.g., the body 604) may have wheels, tracks, or the like, along with a propulsion system (e.g., motor) for mobility.

The depicted arm 610 includes a first portion 612 and a second portion 614 joined by a joint 616. The first portion 612 extends from the body 604 and is articulable with respect to the body 604, and the first portion 612 and second portion 614 are articulable with respect to each other. The motion of the arm 610 (e.g., the first portion 612 and the second portion 614) may be actuated via associated motors that receive control signals provided by the processing unit 640. It may be noted that only two portions are shown in the illustrated embodiment for ease of illustration; however, arms having more portions and joints may be utilized in various embodiments. The depicted arm 610 also includes a sensor 618 configured to sense or detect position and/or motion of the arm 610 (or portions thereof) at the joint to provide feedback to the processing unit 640.

In the illustrated embodiment, the manipulator unit 620 is configured to grasp the target object 602. The manipulator unit 620 may include one or more sensors for detecting contact with the target object 602 and/or for providing feedback during grasping of the target object 602. As seen in FIG. 6, the depicted manipulator unit 620 is mounted at an end of the arm 610. While the depicted manipulator unit 620 is configured to grasp an item, additional or alternative tasks may be performed by the manipulator unit 620 in various embodiments. For example, in the illustrated embodiment, the arm 610 and manipulator unit 620 are configured to grasp and actuate a lever (e.g., a lever from brake bleeding of a rail car); however, in other embodiments, the arm 610 and manipulator unit 620 may additionally or alternatively be configured to perform other tasks, such as inspection or maintenance tasks. In various embodiments, the manipulator unit 620 may include one or more arms, hinges, linkages, or other mechanisms to control the position of one or more grippers, holders, cameras, or other devices. In various embodiments, the manipulator unit 620 may include one or more motors, gears, cylinders, or the like to actuate a mechanism based on control signals or commands provided by the processing unit 640. The manipulator unit 620 may be hydraulically, electrically, or otherwise actuated. For example, the manipulator unit 620 may be configured to grasp and manipulate an item, for example to release a brake, actuate a switch, secure (or release) a latch or fastener, position and hold a part or tool for use in maintenance and inspection of a rail car, load a part or tool to be transported on to the robot system 600 (or off-load the tool or part from the robot system 600), or the like. Alternatively or additionally, the manipulator unit 620 may be used to position a device used to collect information. For example, the manipulator unit 620 may position an inspection camera in a difficult to reach area (e.g., underneath a rail car), with information from the camera used for inspection or diagnostic purposes.

The perception acquisition unit 630 is mounted to the arm 610 and configured to acquire perception information corresponding to a position of the arm 610 to the target object 602 at an acquisition rate. An acquisition rate may be understood as a rate at which distinct sets of imaging information (e.g., images, frames) may be acquired. For example, the perception acquisition unit 630 may acquire images or imaging information at a rate of 1 frame per second, or 1 Hz. In the illustrated embodiment, the perception acquisition unit 630 is mounted to the arm 610 proximate the end of the arm 610 to which the manipulator unit 620 is joined (e.g., at a "wrist" position). The depicted perception acquisition unit 630 acquires perception information regarding location of the target object 602 relative to a position of the arm 610 (e.g., a distance from a portion of the target object 602 to be grasped to the manipulator unit 620 mounted on the arm 610). In various embodiments, the perception acquisition unit 630 may include one or more of a camera, stereo camera, or laser sensor.

The depicted processing unit 640 is operably coupled to the arm 610 and the perception acquisition unit 630. For example, the processing unit 640 may provide control signals to and receive feedback signals from the arm 610, and may receive perception information from the perception acquisition unit 630. In the illustrated embodiment, the processing unit 640 is disposed onboard the robot system 600 (e.g., on-board the base or body 604); however, in some embodiments the processing unit 640 or a portion thereof may be located off-board. For example, all or a portion of the robot system 600 may be controlled wirelessly by a remote controller. The processing unit 640 may also be operably coupled to an input unit (not shown) configured to allow an operator to provide information to the robot system 600, for example to identify or describe a task to be performed. As used herein, a control rate may be understood, for example, as a rate at which distinct control signals or commands may be determined, provided, and executed.

The depicted processing unit 640 is also configured to predict or estimate positioning of the arm 610 to provide predicted position information using the perception information and control signal information. In some embodiments, the predicted or estimated position of the arm 610 at a given (e.g., current) time may be determined based on a previous position of the arm at an initial time, velocity information corresponding to a velocity of the arm between the initial time and the current time, and the amount of time elapsed between the initial time and the current time. For example, at an initial time, the arm 610 (and/or manipulator unit 620) may be at a known position relative to the target object 602 (e.g., based on a known starting position or via use of perception information obtained via the perception acquisition unit 630). The arm 610 may be provided with a control signal causing the arm 610 to move. The control signal may specify velocity information, such as both a magnitude and direction of velocity (e.g., a command specifying for one portion of the arm to move at a specified speed in a specified direction). In some embodiments, the velocity information may also include an acceleration (or rate of change of velocity over time) for a movement to be performed.

Based on the velocity information and the amount of time elapsed, the processing unit 640 may predict a position of the arm 610 by modifying the initially determined position based on the velocity information. For example, in one illustrative scenario of one-dimensional motion, the manipulator unit 620 starts at a position of x=0 at an initial time of 0 (where x represents the position along a single direction or axis). A control signal is provided to the arm 610 to actuate the manipulator unit in a positive x-direction at one inch per second. At a subsequent time of 1 second, the processing unit 640 may determine an estimated or predicted position to be at x=1 inch or about 2.5 centimeters (or the initial position of 0 plus the velocity (1 inch/second) or (about 2.5 centimeters/second) times the time elapsed (1 second)). In practice other increments and velocities may be used, acceleration may be utilized and accounted for, and movement may be in one or more additional dimensions. The depicted processing unit 640 is also configured to control the arm 610 using the perception information and the predicted position information. For example, the arm 610 may be controlled using perception information at various points during performance of a task, while using the predicted position information at other points during performance of the task (e.g., at points at which predicted position information is available, but current or reliable perception information is not available). Accordingly, various embodiments provide for a faster rate of control or adjustment than otherwise available for a given acquisition rate, while avoiding or minimizing over-control issues. In various embodiments, the processing unit 640 is configured to control the arm using the predicted position information for a first interval corresponding to the control rate, and to control the arm using the perception information for a second interval corresponding to the acquisition rate. For example, a given interval may be the inverse of the corresponding rate. It may be noted that control using a type of information for an interval does not necessarily mean that the type of information is used over the entire interval. For example, the interval may be understood as the time elapsed for which a control action based on the particular type of information may be changed. For instance, predicted position information may be used during a portion of an acquisition interval where current perception information is not available. In various embodiments, use of perception information may be given preference over use of predicted information. In some embodiments, the processing unit 640 may determine predicted or estimated position information only when current perception information is not available.

Figure 7:
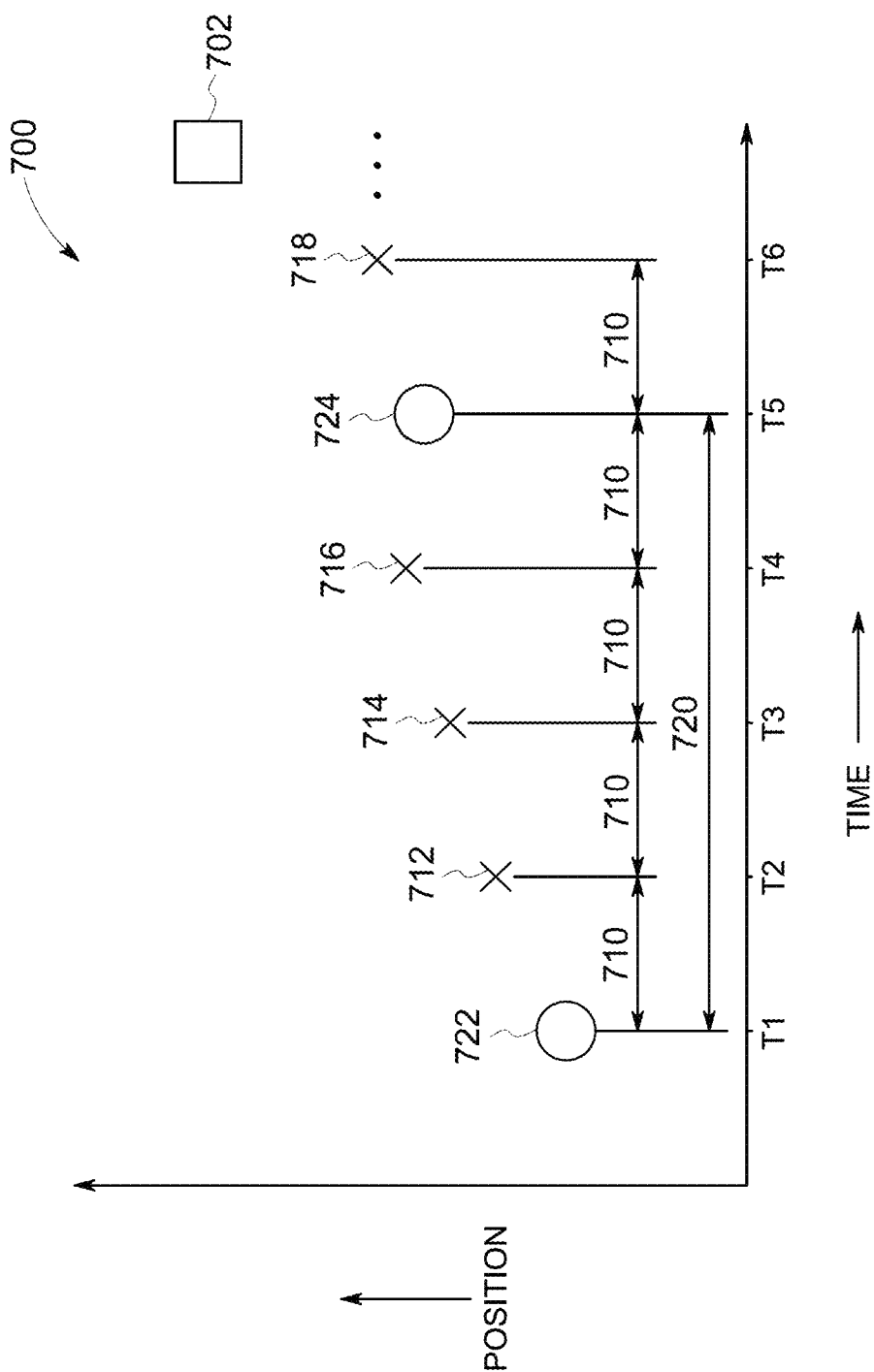
FIG. 7 is a graph depicting control operations in accordance with various embodiments.

FIG. 7 illustrates a graph 700 depicting position of an arm (e.g., a portion thereof) over time. The graph 700 is only for a single positional dimension for ease of illustration. It may be noted that movement in 2 or 3 dimensions may be employed, perceived or detected, and predicted in various embodiments. The graph 700 depicts predicted positions 712, 714, 716, and 718, each spaced at a control interval 710 from an immediately preceding position (either perception or predicted), as well as perception positions 722 and 724 spaced apart at a perception interval of 720. With the control rate faster than the perception rate, the control interval 710 is shorter than the perception interval 720. For the example scenario depicted in FIG. 7, the arm is being controlled to move toward a desired position 702. The desired position is indicated by a square, positions identified by perception information are indicated by circles, and position estimated or predicted using control signal information are indicated by X's.

In an example scenario, the arm starts at a position 722 at an initial time T1 that is determined using information from a perception acquisition unit. As the position 722 is below the desired position 702, a control signal is provided to the arm to actuate the arm in a positive direction and toward the desired position 702. Once the arm starts moving, the previously perceived position 722 is no longer current. Because the control rate is faster than the acquisition rate, a control instruction may be provided or modified before updated acquisition information is available.

Accordingly, in the example scenario, a predicted position 712 is determined at time T2. The predicted position 712 is based on the position 722 modified by the velocity called for by the control signal provided based on the position 722 over the elapsed time between T1 and T2. As the position 712 is below the desired position 702, a control signal is next provided to the arm to actuate the arm in a positive direction and toward the desired position 702.

At time T3, current acquisition information is still not available, so a predicted position 714 is determined at time T3, and used to control the arm between times T3 and T4. The predicted position 714 is based on the position 712 modified by the velocity called for by the control signal provided based on the position 712 over the elapsed time between T2 and T3. As the position 714 is still below the desired position 702, another control signal is next provided to the arm to actuate the arm in a positive direction and toward the desired position 702.

Also, at time T4 of the example scenario, current acquisition information is not available. Accordingly, a predicted position 716 is determined at time T4, and used to control the arm between times T4 and T5. The predicted position 716 is based on the predicted position 714 (at T3) modified by the velocity called for by the control signal provided based on the position 714 over the elapsed time between T3 and T4. As the position 716 is still below the desired position 702, another control signal is next provided to the arm to actuate the arm in a positive direction and toward the desired position 702.

At time T5, current acquisition information is available once again, and is used to determine the position 724. As the position 724 is still below the desired position 702, a control signal is again provided to the arm to actuate the arm in a positive direction and toward the desired position 702 between times T5 and T6. Once the arm starts moving, the previously perceived position 724 is no longer current. Accordingly, a predicted position 718 is determined at time T6. The predicted position 718 is based on the position 724 modified by the velocity called for by the control signal provided based on the position 724 over the elapsed time between T5 and T6. As the position 718 is below the desired position 702, another control signal is next provided to the arm to actuate the arm in a positive direction and toward the desired position 702. The process may be continued until the arm is at the desired position 702.

It should be noted that the above discussed example of FIG. 7 is provided by way of example for illustrative purposes. In various embodiments, different numbers of predictive cycles may occur between acquisition cycles (for example, in the illustrated embodiment, the control rate is 4 times faster than the perception or acquisition rate; however, in other embodiments the control rate may be 2 times faster than the perception or acquisition rate, 5 times faster, or 10 times faster, among others). Further, it may be noted that, while the example of FIG. 7 is depicted in terms of a single positional dimension over time, other embodiments may control movements in additional dimensions (e.g., three dimensions). As shown by the above discussion, various embodiments employ predicted positions as an estimate of position when current or reliable perception information is not available, and benefit from the accuracy and/or reliability of perception information when perception information is available.

Thus, in various embodiments, the processing unit 640 is configured to control the arm over a series of plural first intervals (e.g., control interval 710) during at least one second interval (e.g., perception interval 720). In the embodiment depicted in FIG. 7, the control rate (or predictive rate) is four times faster than the perception rate (or acquisition rate), so 3 predicted positions are determined or estimated and used to control the arm before a new, updated, or current perceived position is available. Again, it may be noted that other rates or relative durations of intervals may be employed in various embodiments.

Returning to FIG. 6, the depicted processing unit 640 includes a control module 642, a perception module 644, a prediction module 646, and a memory 648. It may be noted that the particular units or modules shown in FIG. 6 are meant by way of example, and that other arrangements of units or sub-units of the processing unit 640 may be employed in various embodiments, and that other types, numbers, or combinations of modules may be employed in alternate embodiments, and/or various aspects of modules described herein may be utilized in connection with different modules additionally or alternatively. Generally, the various aspects of the processing unit 640 act individually or cooperatively with other aspects to perform one or more aspects of the methods, steps, or processes discussed herein. The processing unit 640 may include processing circuitry configured to perform one or more tasks, functions, or steps discussed herein. It may be noted that "processing unit" as used herein is not intended to necessarily be limited to a single processor or computer. For example, the processing unit 640 may include multiple processors and/or computers, which may be integrated in a common housing or unit, or which may distribute among various units or housings.

The depicted control module 642 uses inputs from the perception module 644 and the prediction module 646 to control movement of the arm 610 based on a location of arm 610 relative to the target object 602 (e.g., based on a difference between a perceived distance between the arm 610 and the target object 602 when perception information is available, and based on a predicted difference when perception information is not available). The control module 642 is configured to provide control signals to the arm 610 (e.g., to one or more motors or other actuators associated with one or more portions of the arm 610), and also to control the manipulator unit 620 once the target object 602 has been reached by the manipulator unit 620. Additionally, the depicted control module 642 also provides, to the prediction module 646, control signal information describing or corresponding to control signals provided to the arm 610, for use by the prediction module 646 in estimating position when perception information is not available.

The depicted perception module 644 is configured to acquire acquisition information from the perception acquisition unit 630, and to determine a location of the arm 610 (e.g., a position of a portion of the arm 610 or component associated therewith such as the manipulator unit 620 relative to the target object 602). The perception module 644 in the illustrated embodiment provides information to the control module corresponding to the location of the arm 610 determined by the perception module 644 using information from the perception acquisition unit 630.

The depicted prediction module 646 is configured to predict positioning of the arm 610 to provide predicted position information using perception information from the perception module 644 (and/or perception acquisition unit 630) and control signal information from the control module 642. Generally, in various embodiments, the prediction module 646 uses a previous position and corresponding control signal information (e.g., velocity and direction of the arm resulting from a control signal over elapsed time since implementation of control signal) to predict a subsequent position. For example, the prediction module 646 may modify a previously determined position (either determined using perception information or from a previous prediction) by an amount corresponding to a velocity of the arm 610 (or portion thereof) corresponding to a control signal (e.g., a magnitude and direction of velocity) provided subsequent to the previously determined position. In various embodiments, acceleration or change in velocity may be present and accounted for.

The memory 648 may include one or more tangible and non-transitory computer readable storage media. The memory 648, for example, may be used to store information corresponding to a task to be performed, a target object, control information (e.g., current and/or recently used control signals and/or movements corresponding thereto) used to predict position, or the like. Further, the process flows and/or flowcharts discussed herein (or aspects thereof) may represent one or more sets of instructions that are stored in the memory 648 for direction of operations of the robot system 600.

It may be noted that the robot system 600 may include additional aspects not expressly depicted in FIG. 6. For example, the robot system 600 may also include a propulsion unit configured to move the robot system 600 between different locations, and/or a communication unit configured to allow the robot system 600 to communicate with a remote user, a central scheduling or dispatching system, or other robot systems, among others.

Figure 8:
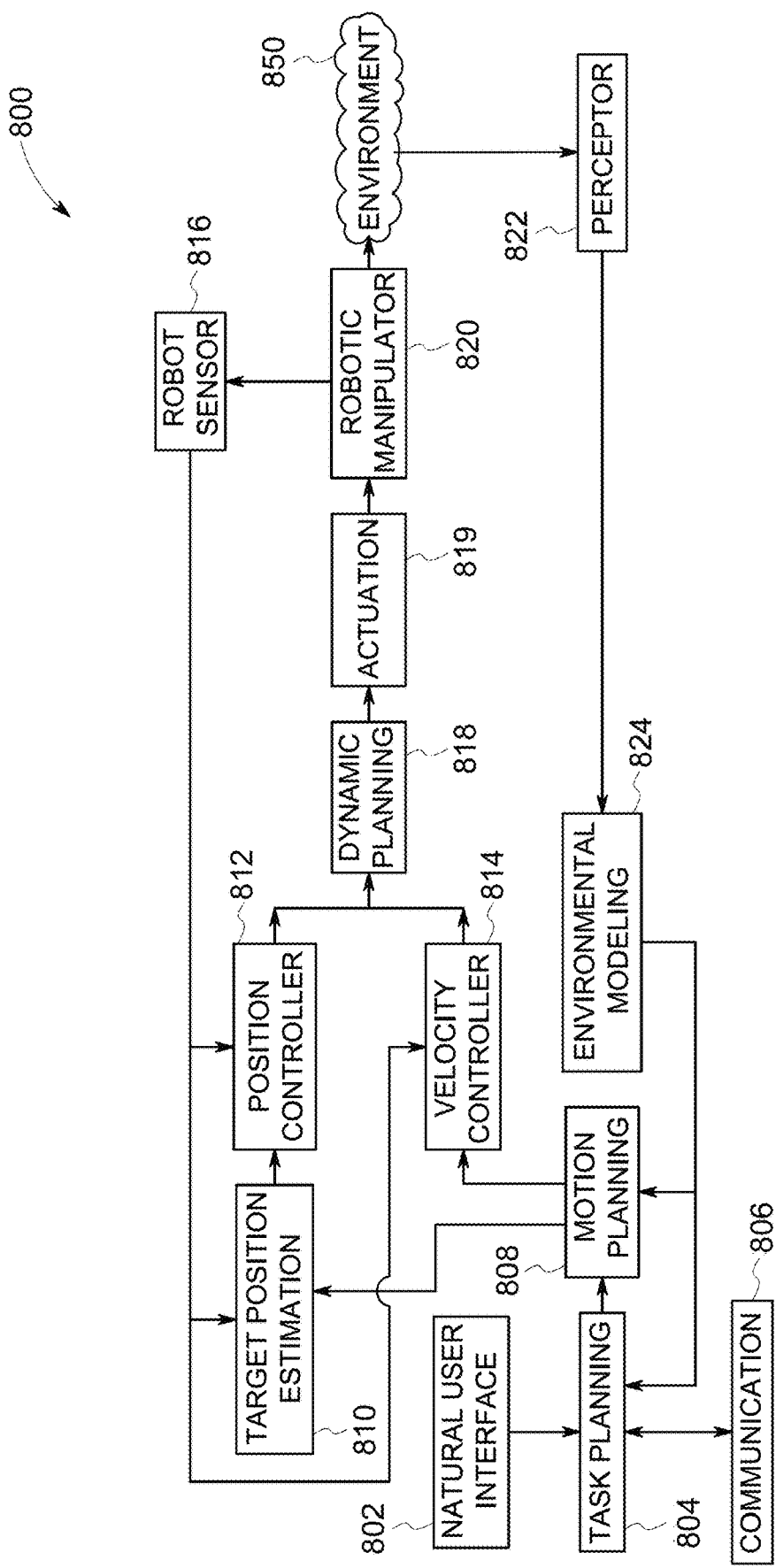
FIG. 8 is a schematic block diagram of a robotic control system in accordance with various embodiments.

FIG. 8 is a schematic block diagram of a robotic control system 800 in accordance with various embodiments. As seen in FIG. 8, the depicted robotic control system 800 is configured for use with an environment 850. The environment 850, for example, may include one or more target objects or locations corresponding to one or more tasks to be performed by a robot system controlled by the robotic control system 800. The robotic control system 800 of the illustrated embodiment includes a user interface 802, a task planning block 804, a communication block 806, a motion planning block 808, a target position estimation block 810, a position controller 812, a velocity controller 814, a robot sensor 816, a dynamic planning block 818, an actuation block 819, a robotic manipulator 820, a preceptor block 822, and an environmental modeling block 824. Aspects of the robotic control system 800 may be employed with the robot system 600 depicted in FIG. 6 (e.g., various blocks of the of the control system 800 may be employed as part of or in conjunction with the processing unit 640). Generally, the core components of the robotic control system 800 are planning modules and controllers. Given a task received either via the user interface 802, or the communication block 806 which communicably couples the robotic control system 800 with one or more other systems, the robotic control system 800 may plan tasks by scheduling task primitives to perform the designated task.

For example, each scheduled task primitive may trigger the motion planning block 808 to generate a motion trajectory, which may include descriptions of position, velocity, and acceleration values of all the via-points, and may incorporate environmental modeling results. In various embodiments, a dual closed loop control system is used to drive the robotic manipulator 820 through all of the via-points with desired dynamic motions. The dual closed loop control system may include a position loop and a velocity loop. The position controller 812 in the illustrated embodiment is closed-loop-based, with feedback information obtained from both the robot being controlled and the environment (e.g., the task space). The depicted velocity controller 814 is also closed-loop-based, but does not receive information from environmental preceptors. From that point of view, the velocity controller 814 may be considered as an "open loop" system, because the feedback information is not obtained from the task space. Computed motion information is sent to the dynamic planning block 818 to generate joint torques to drive the motion of the robotic manipulator. For example, the actuation block 819 may provide necessary input for the robotic manipulator 820 based on computing results from the dynamic planning block 818. Environmental information is sent to the planning modules for higher level one-time planning. Task validation may also be performed at the task planning block 804 using environmental information. Various example hardware and/or algorithms related to certain blocks or aspects of the robotic control system 800 will next be discussed.

The robotic manipulator 820 may include one or more articulated arms. For example, in some embodiment, the robotic manipulator may utilize a robot such as a SIA20F of Yaskawa Motoman Robotics. The SIA20F is a 7-axis single-arm robot for automating operations such as assembly, inspection, machine tending, and handling. For example, in a brake bleeding application, a 15 kilogram payload may be handled, with the robotic manipulator 820 mounted on a mobile base for mobile manipulation. A reaching range of at least 800 millimeters with a repeatable error of less than +/−2 millimeters may be required for performing a brake bleeding task. The SIA20F may be utilized for such an application, as it has 7 degrees of freedom, a specified payload of 20 kilograms, a 910 millimeter maximum reach with +/−0.1 millimeter repeatability, and a relatively light weight of 100 kilograms. It may be noted that additional or alternative manipulators may be employed in various embodiments.

The robot sensor 816 may include one or more encoders disposed on a joint (or joints) of a robot arm. In some embodiments, a rotary/linear encoder may be used to convert rotary/linear position to an analog or digital electronic signal. Using encoder values and forward kinematics, the current kinematic status of the robotic manipulator 820 may be computed, including position, velocity, and acceleration. In some embodiments, to help reduce accumulated drift or associated errors, absolute encoders may be utilized.

In some embodiments, a force-sensing resistor may be utilized for detection of forces and torques. A force-sensing resistor may include a material whose resistance changes when a force or pressure is applied, and corresponding electrical signals are generated. In some embodiments, one more ATI Gamma F/T sensors may be employed. The ATI Gamma F/T sensor is a 6-axis sensor with high precision, with a range of measured forces and torques that satisfy the requirement for a brake bleeding application. For example, the ATI Gamma F/T sensor may have a maximum force of 130 newton (N) with resolution of $\frac{1}{40}$ N in the X and Y directions, a maximum force of 400 N with resolution of $\frac{1}{20}$ N in the Z direction, and a maximum torque in the X, Y, and Z directions of 10 N-meter with $\frac{1}{800}$ N-meter resolution.

The preceptor block 822 may be generally similar in certain respects to the perception acquisition unit 630 discussed herein. The preceptor block 822 may include, for example, a three-dimensional range sensor that returns range values that measure distances between the sensor and one or more points detected in the environment 850 (e.g., one or more target objects or portions thereof). Alternatively or additionally, the preceptor block 822 may include a stereo camera that detects a target object (e.g., brake lever) in the environment 850 and estimates a 6-dimensional pose of the target object.

In various embodiments, an end-effector may be employed for error tolerance. For example, errors may be generated from motion control and/or object detection. In some embodiments, an end-effector may be configured to tolerate errors of 5 centimeters or more on all axes.

The depicted task planning block 804 is configured to receive a task as an input (e.g., from the user interface 802 and/or the communication block 806) and to provide task primitives as an output. Task planning, as used herein, may refer to scheduling a sequence or multiple parallel sequences of tasks for a robot to perform. The task planning block 804 may utilize modern control architecture, such as Task-Based Reactive Control (TBRC), may be used to formulate a control problem as a constrained minimization of task errors, and may efficiently exploit the redundancy of platforms provided in various embodiments. It may be noted that inverse TBRC and Cost Optimization may be utilized to plan the task in order to achieve certain task targets, if the goal of the tasks is considered, to achieve a final state of a control algorithm. In some embodiments, the planning for a typical brake bleeding task is a typical single task-based planning problem with several requirements.

The environmental modeling block 824 may employ point cloud-based techniques. As used herein, environmental modeling may refer to describing a working space of a robot. Different modeling methods may be employed depending on the various requirements of different tasks. Generally, environmental modeling is performed to help robots understand the environment in a way related to a task to be performed. The environmental modeling block 824 in various embodiments receives sensory perception information as an input and provides target position as an output. Due to environmental limitations, high precision in the perception aspects of various embodiments is generally desirable. A point cloud-based method may be utilized to find the location of a target point, while other methods may be employed to segment a target object.

Motion trajectory planning (e.g., performed by the motion planning block 808) in various embodiments may utilize an artificial potential field. Motion trajectory planning may be utilized to determine a smooth and collision-free motion trajectory in the working space for a robot to perform one or more tasks. A generated motion trajectory may be represented, for example, as a sequence of via-points with temporal information and motion information, including position, velocity, and acceleration. The motion planning block 808 may receive target position(s) and obstacle position(s) as an input, and provide a desired position of a next timing step as an output. In some embodiments, a robot's configuration may be treated as appoint in an artificial potential field that combines attraction to the goal, and repulsion from obstacles. The resulting trajectory is output as the path. An advantage of this approach is that the trajectory may be produced with little computation. However, it may be noted that the trajectory may potentially become trapped in local minima of the potential field and fail to find a path. It may be noted that in a closed loop approach, the target position and the obstacles are updated continuously.

The target position estimation block 810 in various embodiments may utilize an extended Kalman filter. It may be noted that, since the frequency of the perception information acquisition in various embodiments is significantly slower than the control frequency, the target position with respect to the robot frame may be estimated in various embodiments using a motion model. Then, in each loop, the estimated target position may be used as a desired reference input for the control algorithm. The target position estimation block 810 may receive motion of the manipulator and estimated target position of the last detection result from the preceptor block 822 as an input, and output an estimated target position. Kalman filtering uses a series of measurements observed over time, containing noise (random variations) and other inaccuracies, and produces estimates of unknown variables that tend to be more precise than those based on a single measurement alone. A Kalman filter may operate recursively on streams of noisy input data to produce a statistically optimal estimate of the underlying system state.

After a desired motion trajectory is generated, the depicted position controller 812 uses a control algorithm to minimize the error between the desired position and the actual positions of the via-points. The position controller 812 receives a desired position at a next timing step as an input and provides a driving step as an output. In various embodiments, a proportional-integral-derivative (PID) controller may be employed. A PID controller is a control loop feedback mechanism widely used in industrial control systems. A PID controller calculates an error value as the difference between a measured process variable and desired setpoint. The controller attempts to minimize the error by adjusting the process through use of a manipulated variable.

The depicted velocity controller 814 may include two parts in some embodiments. The first part is an outer loop that may be developed by users, and the second part is an on-board velocity controller. The user developed velocity controller takes the actual position and the updated target position as an input to compute an error, and then generates a compensation signal for the on-board velocity controller, which enables the robot to control its velocity to reduce the computed error. The input to the first part may be a desired velocity, and the output from the first part may be a velocity compensation signal. The input to the second part may be the velocity compensation signal, and the output from the second part may be a velocity driving signal.

In the illustrated embodiment, the dynamic planning block 818 may utilize hybrid motion and force planning. Generally, dynamic planning involves the conversion of motions into torques on joins using a robotics dynamics model. Use of dynamic planning provides more robust, precise, and flexible control of a robotic manipulator. Currently, many commercially available robots already have dynamic control. The depicted dynamic planning block 818 may receive desired via-points with position, velocity, and acceleration as an input, and provide torques to be provided on joints of a robotic arm as an output. In a hybrid motion and force planning component, the forces are defined and treated separately in the joint space and the task space. This approach plans the motion and force simultaneously by taking the desired motion and forces both in task space and joint space into consideration. The outcome of the planning helps provide optimized result in both the task and joint space.

Generally, the communication block 806 is configured to receive information from other components and to send out status information to other components through one or more communication platforms and/or protocols. In some embodiments, wireless communication based on the Transmission Control Protocol (TCP) may be implemented to realize mobile manipulation and help ensure robust and stable data transmission.

In various embodiments, the user interface 802 may provide a graphical user interface provided to one or more users. Generally, a user interface may be utilized to provide a method for users to observe the status information of the robot and/or control the robot using various controls or commands. For example, in a brake bleeding task, a graphical user interface (GUI) may be used to provide a visual way for human user to observe robot status and use buttons (or other input features) to control a robot.

Figure 9:
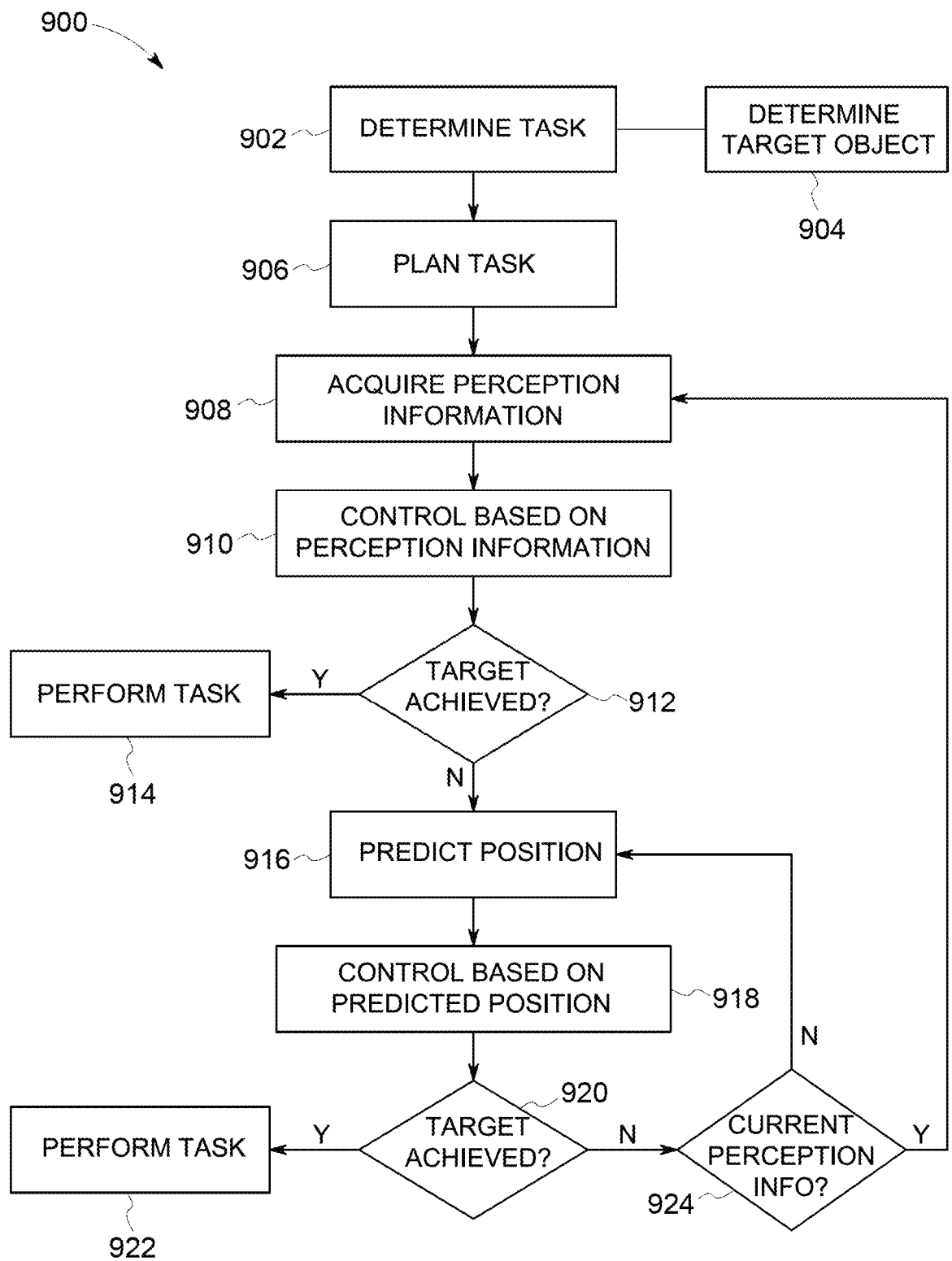
FIG. 9 is a flowchart of a method for controlling a robot in accordance with various embodiments.

FIG. 9 provides a flowchart of a method 900 for controlling a robot, for example a robot for use in a brake bleeding task. In various embodiments, the method 900, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 900 may be able to be used as one or more algorithms to direct hardware to perform operations described herein.

At 902, a task is determined. For example, a task may be entered at a user interface, or otherwise obtained by a system for controlling a robot (e.g., a robot having an articulated arm). For example, the task may be a brake bleeding task in which a robot is to grasp and actuate a lever. As part of, or subsequent to, task determination, one or more target objects (e.g., a lever to be actuated or a portion thereof) is determined. In the illustrated embodiment, at 904, a target object toward which a robotic arm is to be directed is determined. The robotic arm is controlled at a control rate as it is directed toward the target object. The target object, for example, may be a lever that is to be grasped and actuated as part of a brake bleeding task. Alternatively, the target object may be a control toggle, a switch, actuator, or the like.

At 906, the task is planned. For example, motions and/or forces (e.g., positions, velocities, accelerations, and/or torques on one or more joints at various points during task performance) are planned to achieve the task. As discussed herein, in various embodiments, hybrid motion and force planning may be employed, providing torques on joints of a robotic arm based on desired via-points with position, velocity, and acceleration.

At 908, perception information is acquired. Also, a position may be determined based on the acquired perception information. In various embodiments, the perception information corresponds to a position of the arm relative to the target object. The perception information may be acquired via a perception acquisition unit mounted to arm. The perception acquisition unit, for example, may include one or more of cameras, a stereo camera, and/or a 3-dimensional sensor. In the illustrated embodiment, the perception information is acquired at an acquisition rate that is lower than the control rate at which the robotic arm is controlled.

At 910, the robotic system is controlled based on perception information (e.g., based on a position determined using the perception information acquired at 908). For example, in the illustrated embodiment, the arm is controlled to move closer to the target object. The arm may be controlled based on a difference between the position of the arm as determined using perception information from the perception acquisition unit and a desired position corresponding to the target object.

At 912, it is determined if the target location has been achieved. If the target location has been achieved, the method 900 proceeds to 914. In one example the target location includes a predetermined radius from the target object, wherein the pre-determined radius is defined by the distance the arm of the robot can move and perform the task. Thus, in an example wherein the task is moving a brake lever, the target location includes all areas in which the arm of the robot system may reach the brake lever to perform the desired movement. Alternatively, the target location is a predetermined distance from the target object to account for potential error in calculations. At 914, the task is performed (e.g., the lever is grasped and actuated). If the target location has not been achieved, the method 900 proceeds to 916.

At 916, positioning of the arm is predicted to provide predicted position information. For example, the positioning of the arm in the illustrated embodiment may be predicted or estimated using the perception information (e.g., information obtained at 908) and control signal information. The position perceived at 908 may be modified by a motion called for by a control signal provided at 910 to control the arm to determine the estimated position. For example, a predicted position of the arm may be determined at a current time using a previous position of the arm at an initial time, velocity information corresponding to a velocity of the arm between the initial time and the current time (as well as acceleration information if the velocity is not constant, as indicated below), and an amount of time elapsed between the initial time and the current time. It may be noted that, as used herein, velocity information may also include information corresponding to a change of velocity over time or acceleration information. It may be noted that, in the illustrated embodiment, because the control rate is faster than the acquisition rate, at least one cycle of using prediction information may be employed before using perception information again, as a control event will occur at least once before current perception information is again available. Further, a current predicted position may also be determined or estimated using the most recent previous predicted position, if the most recent previous predicted position is more recent than available perception information. In some embodiments, the arm may be controlled to move toward the target object using predicted position information for a first interval corresponding to the control rate, and using the perception information for a second interval corresponding to the acquisition rate. For example, the arm may be controlled over a series of first intervals (using prediction information) during at least one second interval (or time elapsed between availability of perception information).

At 918, the robotic system is controlled based on predicted position information (e.g., based on a position determined or estimated at 916). For example, in the illustrated embodiment, the arm is controlled to move closer to the target object. The arm may be controlled based on a difference between the position of the arm as estimated or predicted and a desired position corresponding to the target object. Alternatively a propulsion unit may be actuated to move the arm closer to the target object based on the predicted position information.

At 920, it is determined if the target location has been achieved. If the target position has been achieved, the method 900 proceeds to 922. At 922, the task is performed (e.g., the lever is grasped and actuated). If the target location has not been achieved, the method 900 proceeds to 924. At 924, it is determined if current or up-to-date perception information is available or will be available before the next control event. If so, the method 900 proceeds to 908 for determination of a current position using perception information. If not, the method proceeds to 916 for determination of a current predicted or estimated position.

Alternatively and additionally, in another embodiment as illustrated in U.S. Ser. No. 15/058,560, filed Mar. 2, 2016, entitled Control System and Method for Applying Force to Grasp a Brake Lever, to Huan et. al. that is incorporated in full herein, an alternative brake system 1000 is illustrated as provided and described in relation to FIGS. 10-13. The systems and methods described in FIGS. 10-13 are generally for a grasping control system, such as an automated system (e.g., a robot) for grasping a break lever, such as one of the system described in U.S. Provisional Application No. 62/269,425, which was filed on Dec. 18, 2015 and is incorporated by reference in its entirety. The automated system may use feedback from one or more sensors to position a manipulator and an end-effector to grasp the break lever. These sensors may include, but are not limited to a force and/or torque sensor installed on an end-effector of the manipulator, position feedback of the robotic arm (e.g., encoders that sense displacement of an arm and/or lever), a peripheral sensor, and/or the like. A computer, such as a controller, reads the sensor inputs and adjusts a position and/or orientation of the end-effector based on the sensor inputs. The controller may continually adjust in real-time the position and/or orientation of the end-effector to enable the automated system to firmly grasp the brake lever. Thereby, a technical effect of the various embodiments described herein provide for real-time planning and adjusting a position and/or orientation of the end-effector. Based on the sensor inputs the controller may generate a plurality of closed loops to control movement and/or drive the manipulator and the end-effector. The sensor inputs may be utilized by the controller as feedback information relating to the automated system and the environment (e.g., area surrounding the automated system, task space) to adjust the manipulator and/or the end-effector.

In particular embodiments, the systems and methods described herein may be used to perform a brake-bleeding task, such as the brake-bleeding tasks described in U.S. Provisional Application Nos. 62/269,523; 62/269,425; 62/269,377; and 62/269,481, the entire disclosures of which are incorporated herein by reference.

For example, the systems and methods described herein can be used generally for closed loop control of a robotic arm to locate and actuate a brake lever to bleed a brake system, such as one of the systems described in U.S.

Provisional Application No. 62/269,481, which was filed on Dec. 18, 2015 and is incorporated herein by reference in its entirety. For example, even with a perception error that is relatively large, such as 2-5 cm, the error decreases as the robotic arm approaches the brake lever due to closed loop feedback from one or more sensors. These sensors can include, but are not limited to, an imaging sensor installed on the robotic arm that moves the brake lever, a force and/or torque sensor installed on the robotic arm, and/or position feedback of the robotic arm (e.g., encoders that sense displacement of the arm). A computer, such as a controller, reads the sensor inputs and provides the following outputs based on the inputs: the location of the brake lever, the current position and movement of the robotic arm, and/or the forces and/or torques applied by the robotic arm (as the arm moves and actuates the brake lever). The sensors provide the outputs to the computer as the robotic arm moves, and updated information is used to revise or adjust the movement of the robotic arm towards the brake lever, reducing the error between the perceived position of the brake lever relative to the position of the robotic arm. Thus, the systems and methods described herein control the robotic arm to increase the efficiency of the brake bleeding task by reducing first attempt failures to bleed the brake system without compromising speed.

The processing speed of perception information acquired by the imaging sensor may be relatively slow, such as around 0.2 Hz. In order to synchronize the perception aspect of the system with the control aspect of the system which conveys control signals to the robotic arm, one or more embodiments described herein implement a step-wise visual servo control algorithm during the brake bleeding task. For example, a motion prediction model may be used to estimate the position of the brake lever relative to the robotic arm as the robotic arm moves towards the brake lever. The motion prediction model provides feedback for closed loop control of the robotic arm. But, since the frequency of the perception is slow, the feedback information may not be available as often as required for the motion prediction model alone to be used to accurately guide the robotic arm. In one or more embodiments, an optical-flow prediction model is used as an additional environmental information source for estimating the relative position and movement between the robotic arm and the brake lever. The estimation provided by the optical-flow prediction model increases the frequency of perception and synchronizes the perception aspect of the system with the control aspect because the estimated variables of location and/or position may be used in control calculations when the slower, but more accurate, perception information is not available.

The systems and methods described herein can be used to validate a brake release action using feedback from one or more sensors, such as the systems and methods described in U.S. Provisional Application No. 62/269,523, which was filed on Dec. 18, 2015 and is incorporated herein by reference in its entirety. These sensors can include, but are not limited to a force and/or torque sensor installed on a robotic arm that moves a brake lever, position feedback of the robotic arm (e.g., encoders that sense displacement of the arm and/or lever), and/or acoustic measurement of the air release using one or more microphones. A computer, such as a controller, reads the sensor inputs and provides the following outputs based on the inputs: whether the brake is released (and, optionally, a confidence value or index indicative of a probability that the brake was released) and/or whether the brake was not released and (and, optionally, a confidence value or index indicative of a probability that the brake was not released). The action of pulling or pushing the brake lever can provide a direct feedback measured as an amount of lever (or rod) displacement and/or an amount of force and torque applied on the lever in several or all directions. The action of pulling or pushing the brake lever can provide an indirect feedback measured as acoustic sound of the air released via a brake valve.

The act of bleeding a brake system can be associated with a priori predicted values of these feedbacks. For example, the sensor feedback can be monitored while attempting to bleed the brake systems of a large sample of vehicles. Based on the sensor feedbacks from this sample and whether the brake systems were or were not released, the probabilities of whether a brake system on other vehicles is or is not released can be determined. For example, the measured difference between the sensor feedbacks from the sample and from a current brake system can be used to validate the brake release and provide the confidence interval (e.g., the confidence value or index). The use of the confidence value or index is used to provide an accurate estimation or validation of whether the brake system was bled. Because there are no known sensors on rail cars to indicate whether an air brake has been released, the systems and methods described herein meet a need by determining whether the air brake is released.

Embodiments may also include systems and methods for communicating information from a control system (e.g., a robotic control system) to an operator of the control system, such as the systems and methods described in U.S. Provisional Application No. 62/269,377, which was filed on Dec. 18, 2015 and is incorporated herein by reference in its entirety. The operator may be a human operator or another system. In some embodiments, the other system may be a supervisor system that is configured to supervise a plurality of control systems or the other system may be similarly configured or may be identical to the control system.

The information communicated to the operator from the control system may be information relating to a task that is being performed by the control system, such as tasks described herein. The communication may be through a system interface that includes hardware and software for communicating the information. For example, the system interface may include a collection of different physical units, such as user displays, light sources, and audio-generating devices (e.g., speakers, horns, and the like). The information may be in the form of visual signals, audible signals, or tactile signals.

Figure 10:
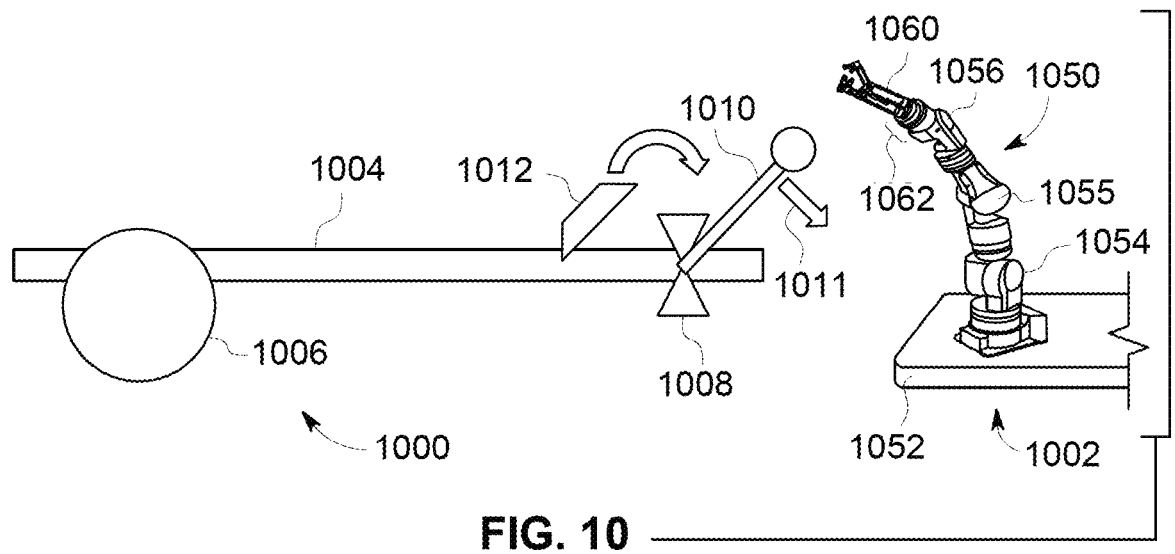
FIG. 10 schematically illustrates a brake system and an automation system according to one embodiment.

FIG. 10 schematically illustrates a brake system 1000 and an automation system 1002 (e.g., a mobile robot) according to one embodiment. In one example the brake system 1000 includes the brake lever as described in relation to the robot system 100 of FIG. 1. The brake system 1000 may be disposed onboard one or more vehicles, such as rail vehicles, automobiles, or the like. The brake system 1000 may operate on a pressure differential within one or more conduits 1004 of the brake system 1000. When the pressure of a fluid, such as air, in the conduits 1004 is below a designated threshold or when the pressure drops by at least a designated amount, the brake system 1000 engages brakes 1006 (e.g., air brakes) of the brake system 1000. Although only one brake 1006 is shown in FIG. 10, the brake system 1000 may include several brakes 1006.

The conduit 1004 is connected with a valve 1008 that closes to retain the fluid within the conduit 1004. The valve 1008 can be opened to release (e.g., bleed) the fluid out of the conduit 1004 and brake system 1000. Once the pressure of the fluid in the conduit 1004 and brake system 1000 drops by or below a designated amount, the brakes 1006 of the brake system 1000 release. The vehicle having the brake system 1000 may then freely roll with the brakes 1006 being disengaged.

The valve 1008 can be actuated by moving a brake lever 1010. The brake lever 1010 may be pulled or pushed (e.g., actuated) to open the valve 1008. For example, the brake lever 1010 may be pulled in a direction of an arrow 1011 to open the valve 1008. Releasing the brake lever 1010 may cause the valve 1008 to close. It should be noted in various other embodiments, the brake lever 1010 may actuate the valve 1008 by moving the brake lever 1010 in alternative directions than shown by the arrow 1011.

A latch 1012 of the brake system 1000 may move under the force of a spring or other device to engage the opened valve 1008 and keep the valve 1008 open. For example, after pulling the brake lever 1010 to open the valve 1008, the latch 1012 may rotate or otherwise move to a position that holds the valve 1008 open. The brake lever 1010 may then be released while the valve 1008 is held open by the engaged latch 1012.

In accordance with one embodiment of the inventive subject matter described herein, the automation system 1002 may position an end-effector 1060 to grasp and actuate the brake lever 1010. The automation system 1002 may be a robot, for example, the automation system 1002 may be configured to be a rail yard robot. In one example the automation system 1002 is the robot system 100 of FIG. 1. In another example the automation system 1002 is the robot system 600 of FIG. 6. The automation system 1002 may include a movable base 1052 and a manipulator 1050. The movable base 1052 may enable the automation system 1002 to move within an environment external to and surrounding the automation system 1002. For example, the movable base 1052 may include a plurality of wheels (not shown) which rotate to allow the automation system 1002 to move away from and/or toward the brake system 1000 within a defined task space. The plurality of wheels may be configured to be driven by a motor and/or steered to move the automation system 1002 about the task space. The task space may correspond to a movable range or distance that the automation system 1002 may move to perform a task, such as grasping and actuating the brake lever 1010. It should be noted that, additionally or alternatively, tracks, legs, or other mechanisms may be utilized to propel or move the automation system 1002.

The movable base 1052 may additionally house electrical components (e.g., one or more processors), which control the operation of the automation system 1002. The movable base 1052 may also provide for the mounting of other components and/or sub-systems, such the manipulator 1050.

The manipulator 1050 may be coupled to and/or mounted on the movable base 1052, and coupled to the end-effector 1060. For example, the end-effector 1060 may be coupled to a wrist 1062 of the manipulator 1050. The manipulator 1050 may be actuated to control the positioning and usage of the end-effector 1060. The manipulator 1050 may be an articulable arm such as a robotic arm and include one or more joints 1054-1056 interposed between the movable base 1052 and the end-effector 1060. Each of the one or more joints 1054-1056 may correspond to an electric motor, hydraulic motor, pneumatic actuators, and/or the like (e.g., motors 1210 shown in FIG. 12), which rotates a portion of the manipulator 1050. For example, the one or more joints 1054-1056 may enable the manipulator 1050 to move the end-effector 1060 towards a target object, such as the brake lever 1010. The one or more joints 1054-1056 are configured to provide movement of the end-effector 1060 with respect to the automation system 1002 by actuating one or more portions of the manipulator 1050. The one or more joints 1054-1056 may provide rotation of the one or more portions of the manipulator 1050 about axes defined by each joint 1054-1056. For example, the joint 1056 may actuate the wrist 1062, which rotates and/or moves the end-effector 1060.

Figure 11A:
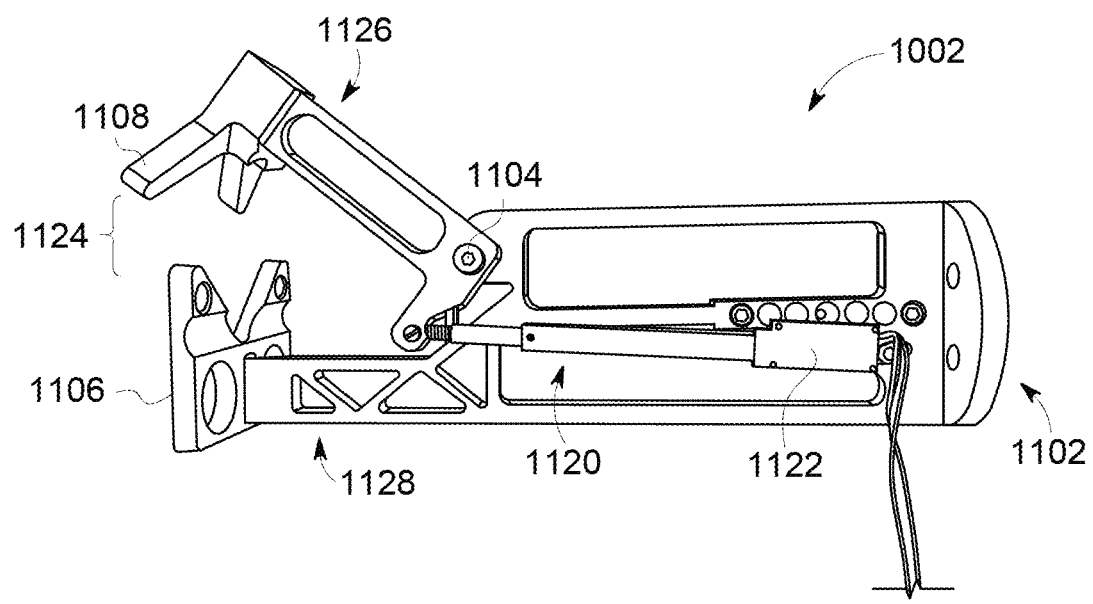
FIG. 11A illustrates a peripheral view of an end-effector with an opening according to one embodiment.
Figure 11B:
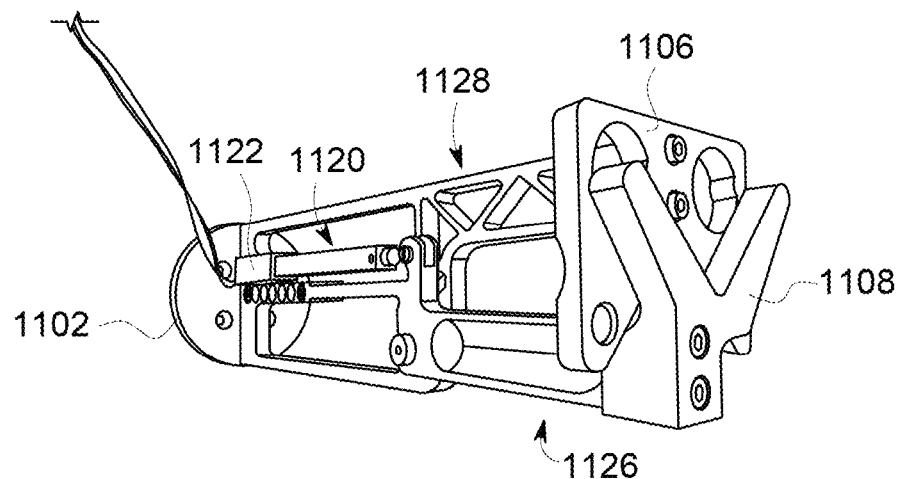
FIG. 11B illustrates a peripheral view of an end-effector without an opening according to one embodiment.

FIGS. 11A-B illustrate a peripheral view of the end-effector 1060 according to one embodiment. The end-effector 1060 may include a base 1102, which is coupled to the wrist 1062 of the manipulator 1050. The end-effector 1060 may be configured to grasp a brake lever for actuation, release, and/or testing of the brake system 1000. For example, the end-effector 1060 may be a gripper such as an impactive gripper with arms 1126-1128. Additionally or alternatively, the end-effector 1060 may be configured to manipulate a switch, to grasp and hold tools for use on a rail car and/or components for installation to or removal from the rail car, and/or the like.

Each arm 1126-1128 may include a finger 1108 and 1106 positioned at a distal end of the arm 1126-1128, respectively. One or more of the arms 1126-1128 may move to create an opening 1124 between the fingers 1106-1108 to allow the brake lever 1010 to be grasped by the end-effector 1060. For example, a cylinder 1120 may rotate the arm 1126 about a pivot point 1104 based on a position of a piston rod controlled by a motor 1122. The opening 1124 is formed by an opening angle from the pivot point 1104 along the arms 1126-1128. As illustrated in FIG. 11A, the cylinder may rotate the arm 1126 such that the finger 1108 is positioned away from the finger 1106 creating the opening 1124. The opening 1124 may allow the brake lever 1010 to be interposed and positioned between the arms 1126-1128.

In operation, a size of the opening 1124 may allow the end-effector 1060 to tolerate errors in positioning the end-effector 1060 relative to the brake lever 1010 for grasping. For example, the brake lever 1010 may be received by the end-effector 1060 (e.g., positioned between the arms 1126-1128) when the brake lever 1010 is positioned along the opening 1124 formed by the arms 1126-1128. Optionally, a size of the opening 1124 may correspond to an error tolerance of the automation system 1002. For example, the end-effector 1050 may tolerate position errors of the brake lever 1010 of at least 5 cm for all axes based on the size of the opening 1124. It should be noted that in other embodiments an error tolerance of the automation system 1002 may be less than 5 cm (e.g., 2 cm, 4 cm) or greater than 5 cm.

When the brake lever 1010 is positioned between the arms 1126-1128, the cylinder 1120 may rotate the arm 1126 toward the arm 1128 to reduce a size of the opening 1124 between the fingers 1106-1108. The reduced size of the opening 1124 may allow the end-effector 1060 to grasp the brake lever 1010 by restricting movement of the brake lever 1010 to remain between the arms 1126-1128 and inside the fingers 1106-1108. Additionally or alternatively, in connection with FIG. 11B, the end-effector 1060 may grasp without the opening 1124.

FIG. 11B illustrates an alternative grasp of the brake lever 1010 with the fingers 1106-1108 in contact with each other. For example, the end-effector 1060 may grasp the brake lever 1010 by positioning the brake lever 1010 directly adjacent and/or flush with a side of at least one of the arms 1126-1128 and at least one of the fingers 1106-1108.

Figure 12:
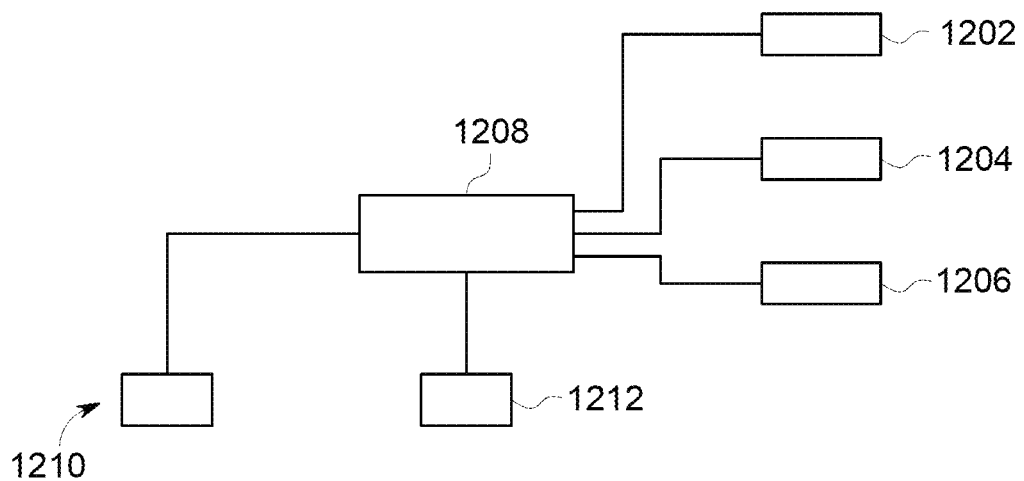
FIG. 12 illustrates a schematic block diagram of the automation system shown in FIG. 10.

FIG. 12 illustrates a schematic block diagram of the automation system 1002 shown in FIG. 10. The automation system 1002 includes a controller circuit 1208 that may direct one or more components of the automation system 1002. The controller circuit 1208 may be housed within the movable base 1052. The controller circuit 1208 may represent hardware circuitry that includes and/or is connected with one or more processors (e.g., microprocessors, field programmable gate arrays, integrated circuits, or other electronic logic-based devices). The controller circuit 1208 may include and/or be communicatively connected with one or more memories, such as computer hard drives, computer servers, SRAM, RAM, and/or the like. The controller circuit 1208 is communicatively coupled with the manipulator 1050 (shown in FIG. 10) by one or more wired and/or wireless connections that allow the controller circuit 1208 to dictate how and where the one or more portions of the manipulator 1050 moves. For example, the controller circuit 1208 may control one or more motors 1210 located at the one or more joints 1054-1056 and the piston, or cylinder 1120 (e.g., the motor 1122) to move and/or actuate portions of the manipulator 1050 and the end-effector 1060, respectively. The motors 1210 may include electric motors, hydraulic motors, pneumatic actuators, and/or the like.

The automation system 1002 includes one or more sensors 1202-1206 that detect operational parameters of the manipulator 1050. For example, the manipulator 1050 may include a force/torque sensor 1202, encoders 1204, and a peripheral sensor 1206, which is electrically coupled to the controller circuit 1208. The one or more sensors 1202-1206 may each generate one or more electrical signals that are received by the controller circuit 1208. It should be noted the electrical signals may be an analog value or a digital value. The one or more electrical signals may include sensory information acquired by the sensor 1202-1206 corresponding to electrical characteristics of the electrical signal (e.g., amplitude, width, bit value, frequency). The controller circuit 1208 may obtain the sensory information at a sampling frequency. For example, the controller circuit 1208 may obtain the sensory information from the force/torque sensor 1202 and the encoder 1204 at 1000 Hz. However, it should be noted that in various embodiments the controller circuit 1208 may receive the sensory information at greater than 100 Hz (e.g., 1 kHz) or lower than 100 Hz. For example, the controller circuit 1208 may obtain the sensory information form the peripheral sensor 1206 at 30 Hz.

The force/torque sensor 1202 may measure a force applied to one or more portions of the manipulator 1050 and/or the end-effector 1060. The force/torque sensor 1202 may include a force-sensing resistor material that changes a resistance when a force and/or pressure is applied. For example, when a force or pressure is applied to the force/torque sensor 1202 electrical characteristics of electrical signals generated by the force/torque sensor 1202 may change, and are detected by the controller circuit 1208. The force/torque sensor 1202 may be positioned approximate to the wrist 1062 of the manipulator 1050, which may measure a force and/or torque being applied to the end-effector 1060, such as by the brake lever 1010.

The encoders 1204 may be a rotary/linear encoder that converts rotary/linear positions of one or more portions of the manipulator 1050 to an analog or digital electronic signal received by the control circuit 1208. The encoders 1204 may be positioned at each joint 1054-1056. During and/or after movement of one or more portions of the manipulator 1050 by actuating the one or more of the joints 1054-1056 the encoder values may change. Based on the changes of the encoder values, a kinematic status of the manipulator 1050 may be computed. The kinematic status may correspond to a change in position of the manipulator 1050, velocity of the one or more portions of the manipulator 1050, and/or acceleration of the one or more portions of the manipulator 1050.

The peripheral sensor 1206 may be an infrared sensor which provides point cloud information. The peripheral sensor 1206 may be positioned on the manipulator 1050 for example, at the wrist 1062. The peripheral sensor 1058 may generate RGB and depth data of the environment around the automation system 1002, which is received by the controller circuit 1208.

Optionally, the controller circuit 1208 may receive electrical signals from a radio frequency (RF) subsystem (not shown). The RF subsystem may form bi-directional communication links using a wireless communication protocol (e.g., WiFi, 802.11, Bluetooth, Zigbee) to receive instructions and/or tasks from a remote system. For example, the RF subsystem may be communicatively coupled to a control or dispatch center. The controller circuit 1208 may receive instructions from the control center via the RF subsystem on a location of the vehicle having the brake system 1000, a location of the brake lever 1010, details and/or specifications of the brake lever 1010 (e.g., direction to actuate the brake lever 1010), and/or the like.

In connection with FIG. 12, the controller circuit 1208 may continually monitor the electrical signals generated by the one or more sensors 1202-1206 in real-time, and adjust a position of the manipulator 1050 and/or end-effector 1060 based on the electrical signals.

Figure 13:
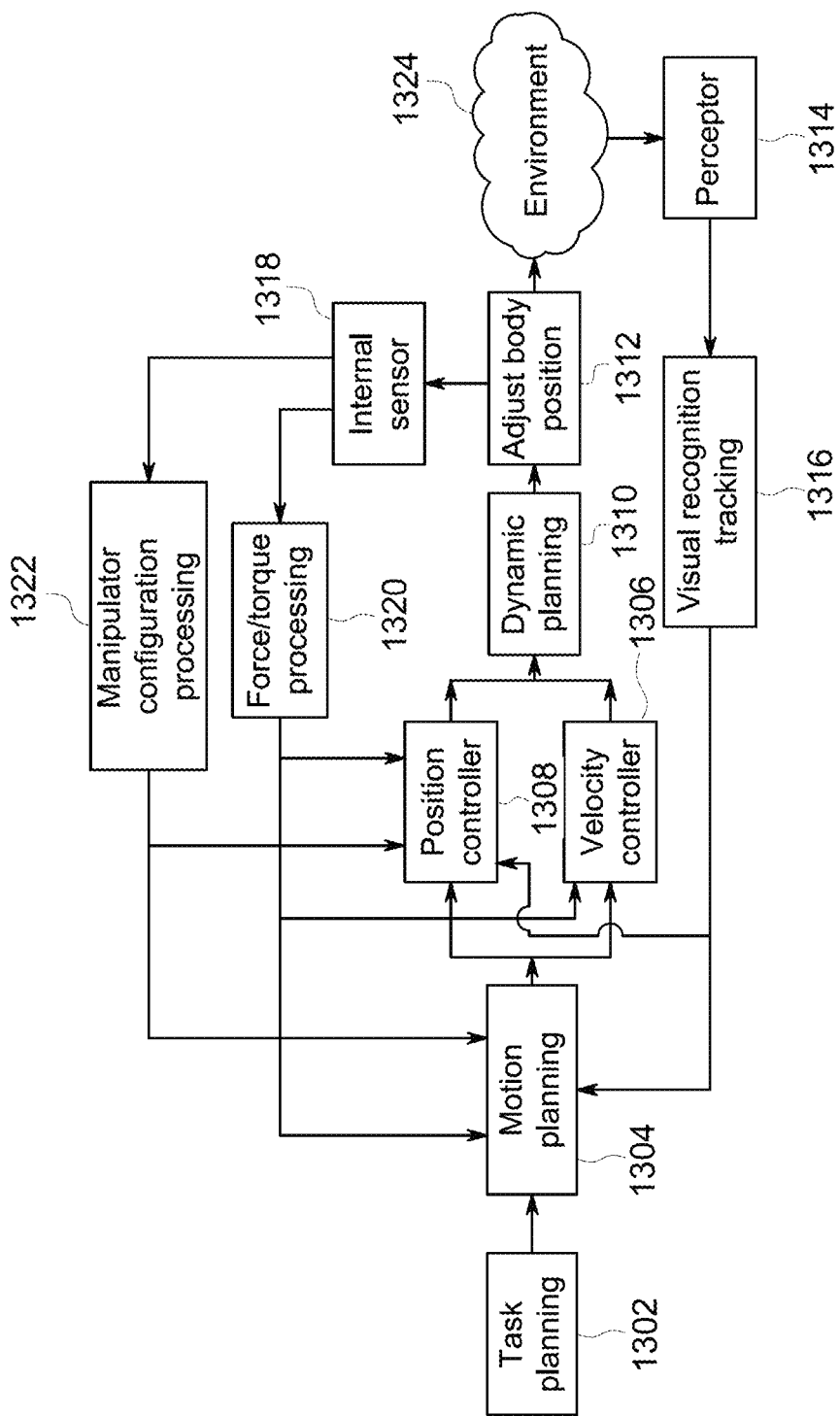
FIG. 13 illustrates a system block diagram of the automation system shown in FIG. 10.

FIG. 13 illustrates a system block diagram of the automation system 1002. For example, each of the system blocks (e.g., 1302-1324) may correspond to one or more operations performed by the controller circuit 1208 and/or components of the automation system 1002 to grasp a target object, such as the brake lever 1010. For example, one or more of the system blocks may correspond to one or more operations performed by the controller circuit 1208 executing one or more algorithms stored on a memory. Additionally or alternatively, one or more of the system blocks may include separate hardware (e.g., controllers, processors, graphical processors) to perform at least a portion of the operations as described herein related to the system blocks.

The system block diagram illustrates two control loops of the controller circuit 1208 formed by the system blocks. A first control loop corresponding to motion control of the manipulator 1050, and a second control loop corresponding to motion control of the arms 1126-1128 of the end-effector 1060. The control loops are based on feedback information received by the controller circuit 1208 from the encoders 1204 on the manipulator 1050, force/torque sensor 1202 on the wrist 1062 of the manipulator 1050, and the peripheral sensor 1206.

The task planning 1302 may correspond to a task or operation to be performed by the automation system 1002. For example, the task planning 1302 may instruct the controller circuit 1208 on specifications of a target object (e.g., shape of the target object), location of the target object with respect to the manipulator 1050 and/or the end-effector 1060, and/or the like. In operation, the task planning 1302 may be based on visual information received by the automation system 1002 from the RF subsystem, a visual sensor (e.g., camera, lidar, sonar, peripheral sensor 1206) of the automation system 1002, and/or the like.

During the motion planning 1304, the controller circuit 1208 may generate a motion trajectory. The motion trajectory may include a plurality of via-points corresponding to positions of the manipulator 1050 and/or the end-effector 1060 ending at a target position. For example, the via-points may include surrounding the target object with the arms 1126-1128 of the end-effector 1060 and slowly closing the arms 1126-1128 towards each other to grasp the target object at the target position. The target position corresponding to a position of the end-effector 1060 relative to the target object that allows the end-effector 1060 to grasp the target object.

The motion planning 1304 may receive sensory information from the encoders 1204 and the force/torque sensor 1202, which is represented by the internal sensor 1318, and the peripheral sensor 1206 represented by the preceptor 1314. For example, the motion trajectory generated at the motion planning 1304 may be based on the sensory information corresponding to electrical signals of the sensors 1202-1206.

The electrical signals generated by the sensors 1202 and 1204 are processed at the manipulator configuration processing 1322 and the force/torque processing 1320. The manipulator configuration processing 1322 may correspond to the operation of the controller circuit 1208 to determine a position of the manipulator 1050 based on the electrical characteristics of the electrical signal received by the encoders 1204. The force/torque processing 1320 may correspond to the operation of the controller circuit 1208 to determine various forces being applied to the end-effector 1060, which applies a force and/or torque to the wrist 1062 of the manipulator 1050. For example, when the brake lever 1010 is surrounded and/or proximate to the end-effector 1060, the brake lever 1010 may be contact with a portion of the end-effector 1060. The contact with the brake lever 1010 applies a force to the end-effector 1060, which may be measured as a rotational force or torque at the wrist 1062.

The visual recognition tracking 1316 may correspond to the operation of the controller circuit 1208 performing a segmentation or identification algorithm to visual information received by the peripheral sensor 1206 to determine a position of the target object (e.g., the brake lever 1010) with respect to the manipulator 1050 and/or end-effector 1060. The visual recognition and tracking 1316 may continuously receive visual information from the preceptor 1314 (e.g., the peripheral sensor 1206) at 30 Hz, process the visual information, and provide pose and/or position of the target object that may manipulated by the end-effector 1060 (e.g., the brake lever 1010). Optionally, the controller circuit 1208 may utilize a cascade method for the visual recognition tracking to increase processing throughput of the controller circuit 1208.

In operation of the visual recognition tracking 1316, the controller circuit 1208 may execute one or more algorithms to locate the target object within the visual information corresponding to environmental modeling (e.g., area surrounding the automation system 1002). For example, the controller circuit 1208 may execute a segmentation or identification algorithm stored on memory to identify the brake lever 1010 within the visual information acquired by the peripheral sensor 1206. The visual information may include RGB data (e.g., image) as well as point cloud information of the environment. The controller circuit 1208 may utilize a two-dimensional image processing method (e.g., Viola-Jones object detection framework) to find one or more possible locations within the visual information that includes the target object (e.g., the brake lever 1010). Based on the one or more possible locations, the controller circuit 1208 may execute a three-dimensional segmentation method utilizing the point cloud data to segment the target object within the one or more possible areas. Optionally, the controller circuit 1208 may apply a learning based algorithm (e.g., Adaptive Boosting, Histogram of Oriented Gradients) to filter the one or more possible locations.

The motion trajectory generated at the motion planning 1304 may include velocity and acceleration values for each via-point. For example, at each via-point the one or more joints 1054-1056 of the manipulator 1050 and/or the end-effector 1060 may be positioned at a different position. The via-points may incorporate environmental modeling results based on the task planning 1302 and environmental modeling to move the end-effector 1060 towards the target object (e.g., the brake lever 1010). For example, the via-points may be a series of successive movements by the manipulator 1050 and the end-effector 1060 to reach a target position. The controller circuit 1208 may drive the motors 1210 based on the velocity and acceleration values to position the manipulator 1050 and/or the end-effector 1060 to each successive via-point.

In operation, the motion planning 1304 may generate via-points that balance the force on the arms 1126-1128 and minimize the torque on the wrist 1062 of the manipulator 1062. For example, based on a position of the target object the motion planning 1304 may generate a motion trajectory with a target position having a smaller force and/or torque on the wrist 1062 relative to other candidate motion trajectories. Additionally or alternatively, in connection with FIGS. 11A-B, the force and/or torque corresponding to the position and/or orientation of the end-effector 1060 may be based on the grasping style for the target object. It may be noted that the force and torque measured by the force/torque sensor 1202 is associated with the motion control of the end-effector 1060.

For example, FIG. 11A may illustrate a Type 1 grasping style. For the Type 1 grasping style, the motion planning 1304 may generate via-points that include the arms 1126-1128 of the end-effector 1060 closing slowly (e.g., reducing a size of the opening 1124) when it touches the surface of the target object. As shown in Equations 1 and 2, the displacement motion along an x and/or y direction of the end-effector 1060 and/or the manipulator 1050 may be proportional to the forces measured by a force/torque sensor. The variables Kx and Ky are constants based on the force/torque sensor 1202 and/or characteristics of the manipulator 1050.

$$\dot{x} = -K_x F_x - \int F_x \quad \text{(Equation 1)}$$

$$\dot{y} = -K_y F_y - \int F_y \quad \text{(Equation 2)}$$

The motion trajectory generated by the motion planning 1304 may be selected based on a horizontal and vertical force (Fx, Fy) with respect to the force/torque sensor 1202, and a torque (Tx, Ty, Tz) of the wrist 1062 with respect to the force/torque sensor 1202. For example, the one or more of the via-points forming the motion trajectory may position and/or orient the end-effector 1060 to have a distributed force with a smaller Fx, Fy, and torque relative to other motion trajectories. As shown in Equations 3-5, the orientation of the end-effector 1060 corresponding to a roll (e.g., variable r), a pitch (e.g., variable p), and yaw (e.g., variable yw) may be proportional to the torque measured by the force/torque sensor. The variables Kp, Kyw, and Kr are constants based on the force/torque sensor 1202 and/or characteristics of the manipulator 1050.

$$\dot{p} = -K_p T_x - \int T_x \quad \text{(Equation 3)}$$

$$\dot{y}_w = -K_{yw} T_y - \int T_y \quad \text{(Equation 4)}$$

$$\dot{r} = -K_r T_z - \int T_z \quad \text{(Equation 5)}$$

In another example, FIG. 11B may illustrate a Type 2 grasping style. For the Type 2 grasping style, the motion planning 1304 may generate via-points that position the target object directly adjacent and/or flush with a side of at least one of the arms 1126-1128 and at least one of the fingers 1106-1108. The motion trajectory generated by the motion planning 1304 may be selected based on a torque (Tz) along a z-axis normal to the base 1102 (shown in FIG. 11). For example, the one or more of the via-points forming the motion trajectory may position and/or orient the end-effector 1060 to have a smaller Tz relative to other motion trajectories.

In operation, as the controller circuit 1208 transitions the manipulator 1050 and the end-effector 1060 along the motion trajectory (e.g., succeeding via-points) corresponding to the adjust body position 1312 the controller circuit 1208 may adjust future via-points in real-time. For example, the controller circuit 1208 may adjust the future via-points based on feedback from the one or more sensors 1202-1206 to assure the force on the arms 1126-1128 is balanced and/or minimize the torque on the wrist 1062 of the manipulator 1050.

The position controller 1308 and the velocity controller 1306 may correspond to operations of the controller circuit 1208 that adjust the one or more future via-points generating an updated motion trajectory. Based on the updated motion plan, the controller circuit 1208 may generate drive signals for the motors 1210 corresponding to operations performed at dynamic planning 1310. The generated drive signals may adjust a position of the manipulator 1050 and/or the end-effector 1060. For example, the updated motion trajectory generated by the position controller 1308 and the velocity controller 1306 may adjust a position and/or orientation of the end-effector 1060 to enable the automation system 1002 to properly grasp the brake lever 1010 without and/or reducing a change of damaging the automation system 1002. It may be noted that a frequency of the updated motion trajectory or position control rate may be based on the sampling frequency of the controller circuit 1208. For example, the controller circuit 1208 may adjusts the motion of the trajectory at a rate of 10 to 100 Hz.

The position controller 1308 may be based on a closed-loop using sensory information corresponding to positions of the automation system 1002 (e.g., the manipulator 1050, the end-effector 1060) and the environment surrounding the automation system 1002 (e.g., the task space). In operation, the position controller 1308 may receive a desired position of the manipulator 1050 and/or the end-effector 1060 corresponding to a succeeding via-point, and output a drive signal instructing the manipulator 1050 and/or the end-effector 1060 to move to a position (e.g., the succeeding via-point, an adjusted succeeding via-point). The position controller 1308 may correspond to a control algorithm executed by the controller circuit 1208 to minimize the error between the desired position and the actual positions of the via-points. For example, the position controller 1308 may include a proportional-integral-derivative controller (PID controller).

In operation, the PID controller may calculate an error value. The error value representing a difference between a measured process variable and a desired set point (e.g., via points of the motion trajectory). The measured process variable corresponding to the sensory information received by the position controller 1308. For example, the desired set point may correspond to a relative force (e.g., Fx, Fy) and/or torque (e.g., Tx, Ty, Tz) that are based on the motion trajectory determined during the motion planning 1304. The PID controller may adjust the future via-points (e.g., points of the motion trajectory not reached by the manipulator 1050 and/or the end-effector 1060) to reduce the error value.

For example, the measured process variable may correspond to a force measurement of Fx greater than Fy. The PID controller may determine an error value corresponding to the imbalance in the force. The PID controller may determine an adjusted via-point, which may adjust a position of the end-effector 1060 and/or the manipulator 1050 to reduce the Fx to be approximately the same as Fy.

The electrical signals generated by the sensors 1202 and 1204 are processed at the manipulator configuration processing 1322 and the force/torque processing 1320. The manipulator configuration processing 1322 may correspond to the operation of the controller circuit 1208 to determine a position of the manipulator 1050 based on the electrical characteristics of the electrical signal received by the encoders 1204. For example, the manipulator configuration processing 1322 may determine the forward kinematics (e.g., change in position) of the manipulator 1050. The force/torque processing 1320 may correspond to the operation of the controller circuit 1208 to determine various forces being applied to the end-effector 1060, which applies a force and/or torque to the wrist 1062 of the manipulator 1050. For example, when the brake lever 1010 is surrounded and/or proximate to the end-effector 1060, the brake lever 1010 may be contact with a portion of the end-effector 1060. The contact with the brake lever 1010 applies a force to the end-effector 1060, which may be measured as a rotational force or torque at the wrist 1062.

The visual recognition tracking 1316 may correspond to the operation of the controller circuit 1208 performing a segmentation or identification algorithm to visual information received by the peripheral sensor 1206 to determine a position of the target object (e.g., the brake lever 1010) with respect to the manipulator 1050 and/or end-effector 1060. The visual recognition and tracking 1316 may continuously receive visual information from the preceptor 1314 (e.g., the peripheral sensor 1206) when the manipulator 1050 and/or the end-effector 1060 are moving. Optionally, the visual recognition and tracking 1316 may use the forward kinematics determined by the manipulator configuration processing 1322. For example, the forwards kinematics of the manipulator 1050 may be sued to determine an overall position of the manipulator 1050. Utilizing the position of the manipulator 1050, the visual recognition tracking 1316 may perform a three dimensional segmentation on the visual information to determine a position of the target object (e.g., the brake lever 1010).

The velocity controller 1306 may be based on a closed-loop using sensory information corresponding to positions of the automation system 1002 (e.g., the manipulator 1050, the end-effector 1060). In operation, the velocity controller 1306 may receive a desire velocity of the manipulator 1050 and/or the end-effector 1060, and output a velocity compensation signal. Based on the velocity compensation signal, the velocity controller 1306 may output a velocity drive signal for the manipulator 1050 and/or the end-effector 1060.

This velocity controller 1306 may include two parts: a first outer loop to calculate the velocity compensation signal, and a second outer loop for generating the drive signal. Optionally, the first loop may be configured by a user. The first outer loop may utilize the position of the manipulator 1050 and/or the end-effector 1060 and the succeeding via-point to calculate an error value. Based on the error value, the velocity controller 1306 may generate a velocity compensation signal. The velocity compensation signals may be configured to adjust a velocity of the manipulator 1050 and/or the end-effector 1060 to reduce the error value.

The dynamic planning 1310 may correspond to one or more operations of the controller circuit 1208, which convert the drive signals generated by the position controller 1308 and the velocity controller 1306 into torque values for each of the joints 1054-1056 of the manipulator 1050. The dynamic planning 1310 may include a robotic dynamics model. The robotic dynamic model may correspond to one or more algorithms that define how the manipulator 1050 moves in respond to the torques applied by the joints 1054-1056. For example, based on the robotic dynamic model and the drive signals corresponding to a velocity and/or position of the manipulator 1050, the controller circuit 1208 may determine an applied torque to be applied to each of the joints 1054-1056.

In operation, the dynamic planner 1310 may perform a hybrid motion and force planning component by defining the forces separately in the joint space (e.g., torque applied to the joints 1054-1056) and the task space (e.g., the drive signals received by the velocity controller 1306 and the position controller 1308). For example, the dynamic planner 1310 may determine the motion of the manipulator 1050 and the force simultaneously by taking the desired motion and forces both in task space and joint space into consideration. The outcome of the planning may optimize the results both in the task space and the joint space.

In one embodiment, a robotic system includes a controller configured to obtain image data from one or more optical sensors and to determine one or more of a location and/or pose of a vehicle component based on the image data. The controller also is configured to determine a model of an external environment of the robotic system based on the image data and to determine tasks to be performed by components of the robotic system to perform maintenance on the vehicle component. The controller also is configured to assign the tasks to the components of the robotic system and to communicate control signals to the components of the robotic system to autonomously control the robotic system to perform the maintenance on the vehicle component. The robotic system also includes a propulsion system that moves the robotic system based on the control signals, and a manipulator arm configured to actuate the vehicle component based on the control signals. The model of the external environment of the robotic system provides locations of objects external to the robotic system relative to the robotic system, grades of a surface on which the robotic system is traveling, and obstructions in the moving path of the robotic system, and the model of the external environment of the robotic system is determined only for a designated volume around the manipulator arm.

The controller can be configured to obtain two dimensional (2D) and three dimensional (3D) image data from the one or more optical sensors as the image data. The controller can be configured to determine the model of the external environment as a grid-based representation of the external environment based on the image data. The controller optionally is configured to determine the tasks to be performed by a propulsion system that moves the robotic system and a manipulator arm configured to actuate the vehicle component.

In one example, the controller is configured to determine the tasks to be performed by the robotic system based on the model of the external environment and the one or more of the location or pose of the vehicle component. The controller can be configured to determine waypoints for a propulsion system of the robotic system to move the robotic system based on one or more of the tasks assigned to the propulsion system by the controller and on a mapping of a location of the robotic system in the model of the external environment determined by the controller.

Optionally, the controller is configured to receive a feedback signal from one or more touch sensors representative of contact between a manipulator arm of the robotic system and an external body to the robotic system, and to assign one or more of the tasks to the manipulator arm based also on the feedback signal. The controller can be configured to determine a movement trajectory of one or more of a propulsion system of the robotic system or a manipulator arm of the robotic system based on the tasks that are assigned and the model of the external environment.

In one example, the vehicle component of a brake lever of an air brake for a vehicle.

In one embodiment, a method includes obtaining image data from one or more optical sensors, determining one or more of a location or pose of a vehicle component based on the image data, determining a model of an external environment of the robotic system based on the image data, determining tasks to be performed by components of the robotic system to perform maintenance on the vehicle component, assigning the tasks to the components of the robotic system, and communicating control signals to the components of the robotic system to autonomously control the robotic system to perform the maintenance on the vehicle component.

The image data that is obtained can include two dimensional (2D) and three dimensional (3D) image data from the one or more optical sensors. The model of the external environment can be a grid-based representation of the external environment based on the image data. The tasks can be determined to be performed by a propulsion system that moves the robotic system and a manipulator arm configured to actuate the vehicle component.

Optionally, the tasks are determined based on the model of the external environment and the one or more of the location or pose of the vehicle component. The method also can include determining waypoints for a propulsion system of the robotic system to move the robotic system based on one or more of the tasks assigned to the propulsion system and on a mapping of a location of the robotic system in the model of the external environment. In one example, the method also includes receiving a feedback signal from one or more touch sensors representative of contact between a manipulator arm of the robotic system and an external body to the robotic system, where one or more of the tasks are assigned to the manipulator arm based on the feedback signal.

The method also may include determining a movement trajectory of one or more of a propulsion system of the robotic system or a manipulator arm of the robotic system based on the tasks that are assigned and the model of the external environment.

In one embodiment, a robotic system includes one or more optical sensors configured to generate image data representative of an external environment and a controller configured to obtain the image data and to determine one or more of a location or pose of a vehicle component based on the image data. The controller also can be configured to determine tasks to be performed by components of the robotic system to perform maintenance on the vehicle component and to assign the tasks to the components of the robotic system based on the image data and based on a model of the external environment. The controller can be configured to communicate control signals to the components of the robotic system to autonomously control the robotic system to perform the maintenance on the vehicle component. The robotic system includes a propulsion system that moves the robotic system based on the control signals, and a manipulator arm configured to actuate the vehicle component based on the control signals. The controller is configured to determine waypoints for the propulsion system of the robotic system to move the robotic system based on one or more of the tasks assigned to the propulsion system by the controller and on a mapping of a location of the robotic system in the model of the external environment determined by the controller, and 3D image data is examined using real-time simultaneous localization and mapping to determine the model of the external environment of the robotic system.

Optionally, the controller also is configured to determine the model of an external environment of the robotic system based on the image data. The controller can be configured to determine waypoints for a propulsion system of the robotic system to move the robotic system based on one or more of the tasks assigned to the propulsion system by the controller and on a mapping of a location of the robotic system in the model of the external environment determined by the controller.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A robotic system comprising:
a controller configured to obtain image data from one or more sensors, the controller also configured to determine a location and a pose of a vehicle component based on the image data and to determine a model of an external environment of the robotic system based on the image data, the controller configured to determine a mapping of a location of the robotic system in the model of the external environment, the controller also configured to determine tasks to be performed by components of the robotic system to perform maintenance on the vehicle component and to assign the tasks to the components of the robotic system, wherein the controller also is configured to communicate control signals to the components of the robotic system to autonomously control the robotic system to perform the maintenance on the vehicle component;
a propulsion system that moves the robotic system based on the control signals; and
a manipulator arm configured to actuate the vehicle component based on the control signals,
wherein the model of the external environment of the robotic system provides locations of objects external to the robotic system relative to the robotic system, grades off a surface on which the robotic system is traveling, and obstructions in the moving path of the robotic system relative to the location of the robotic system in the model of the external environment; and
wherein the model of the external environment of the robotic system is determined only for a designated volume around the manipulator arm.

2. The robotic system of claim 1, wherein the controller is configured to obtain two dimensional (2D) and three dimensional (3D) image data from the one or more optical sensors as the image data.

3. The robotic system of claim 1, wherein the controller is configured to determine the model of the external environment as a grid-based representation of the external environment based on the image data.

4. The robotic system of claim 1, wherein the controller is configured to determine the tasks to be performed by the propulsion system and the manipulator arm.

5. The robotic system of claim 1, wherein the controller is configured to determine the tasks to be performed by the robotic system based on the model of the external environment and the location and the pose of the vehicle component.

6. The robotic system of claim 1, wherein the controller is configured to determine waypoints for the propulsion system of the robotic system to move the robotic system based on one or more of the tasks assigned to the propulsion system by the controller and the mapping of the location of the robotic system in the model of the external environment.

7. The robotic system of claim 1, wherein the controller is configured to receive a feedback signal from one or more touch sensors representative of contact between a manipulator arm of the robotic system and an external body to the robotic system, the controller also configured to assign one or more of the tasks to the manipulator arm based also on the feedback signal.

8. The robotic system of claim 1, wherein the controller is configured to determine a movement trajectory of one or more of the propulsion system of the robotic system or a manipulator arm of the robotic system based on the tasks that are assigned and the model of the external environment.

9. The robotic system of claim 1, wherein the vehicle component is a brake component of an air brake for a vehicle.

10. A method comprising:
obtaining image data from one or more optical sensors;
determining a location and a pose of a vehicle component based on the image data;
determining a model of an external environment of a robotic system based on the image data;
determining a mapping of a location of the robotic system in the model of the external environment;
determining tasks to be performed by components of the robotic system to perform maintenance on the vehicle component;
assigning the tasks to the components of the robotic system;
communicating control signals to the components of the robotic system to autonomously control the robotic system to perform the maintenance on the vehicle component;
utilizing the control signals to move the robotic system; and
actuating the vehicle component based on the control signals.

11. The method of claim 10, wherein the image data that is obtained includes two dimensional (2D) and three dimensional (3D) image data from the one or more optical sensors.

12. The method of claim 10, wherein the model of the external environment is a grid-based representation of the external environment based on the image data.

13. The method of claim 10, wherein the tasks are determined to be performed by a propulsion system that moves the robotic system and a manipulator arm configured to actuate the vehicle component.

14. The method of claim 10, wherein the tasks are determined based on the model of the external environment and the location and the pose of the vehicle component.

15. The method of claim 10, further comprising determining waypoints for a propulsion system of the robotic system to move the robotic system based on one or more of the tasks assigned to the propulsion system and on the mapping of the location of the robotic system in the model of the external environment.

16. The method of claim 10, further comprising receiving a feedback signal from one or more touch sensors representative of contact between a manipulator arm of the robotic system and an external body to the robotic system, wherein one or more of the tasks are assigned to the manipulator arm based on the feedback signal.

17. The method of claim 10, further comprising determining a movement trajectory of one or more of a propulsion system of the robotic system or a manipulator arm of the robotic system based on the tasks that are assigned and the model of the external environment.

18. A robotic system comprising:
one or more optical sensors configured to generate image data representative of an external environment;
a controller configured to obtain the image data and to determine one or more of a location and pose of a vehicle component based on the image data, the controller also configured to determine tasks to be performed by components of the robotic system to perform maintenance on the vehicle component and to assign the tasks to the components of the robotic system based on the image data and based on a model of the external environment, the controller configured to determine a location of the robotic system in the model of the external environment, wherein the controller also is configured to communicate control signals to the components of the robotic system to autonomously control the robotic system to perform the maintenance on the vehicle component;
a propulsion system that moves the robotic system based on the control signals; and
a manipulator arm configured to actuate the vehicle component based on the control signals;
wherein the controller is configured to determine waypoints for the propulsion system of the robotic system to move the robotic system based on one or more of the tasks assigned to the propulsion system by the controller and on the mapping of the location of the robotic system in the model of the external environment;
wherein 3D image data is examined using real-time simultaneous localization and mapping to determine the model of the external environment of the robotic system.

19. The robotic system of claim 18, wherein the controller also is configured to determine the model of an external environment of the robotic system based on the image data.

20. The robotic system of claim 18, wherein the model of the external environment of the robotic system is determined only for a designated volume around the manipulator arm.

* * * * *